(12) United States Patent
Hunstable

(10) Patent No.: US 11,784,523 B2
(45) Date of Patent: *Oct. 10, 2023

(54) MULTI-TUNNEL ELECTRIC MOTOR/GENERATOR

(71) Applicant: Linear Labs, Inc., Fort Worth, TX (US)

(72) Inventor: Fred E. Hunstable, Granbury, TX (US)

(73) Assignee: Linear Labs, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/591,850

(22) Filed: Feb. 3, 2022

(65) Prior Publication Data

US 2022/0385125 A1 Dec. 1, 2022

Related U.S. Application Data

(63) Continuation of application No. 16/601,529, filed on Oct. 14, 2019, now Pat. No. 11,258,320, which is a continuation of application No. 15/848,540, filed on Dec. 20, 2017, now Pat. No. 10,447,103, which is a continuation of application No. (Continued)

(51) Int. Cl.
| | | |
|---|---|---|
| *H02K 1/27* | (2022.01) | |
| *H02K 1/2796* | (2022.01) | |
| *H02K 1/02* | (2006.01) | |
| *H02K 21/14* | (2006.01) | |
| *H02K 3/28* | (2006.01) | |
| *H02K 15/08* | (2006.01) | |
| *H02K 3/12* | (2006.01) | |
| *H02K 21/12* | (2006.01) | |
| *H02K 1/14* | (2006.01) | |
| *H02K 1/30* | (2006.01) | |
| *H02K 1/2791* | (2022.01) | |

(Continued)

(52) U.S. Cl.
CPC ............. *H02K 1/2796* (2022.01); *H02K 1/02* (2013.01); *H02K 1/145* (2013.01); *H02K 1/2791* (2022.01); *H02K 1/30* (2013.01); *H02K 3/12* (2013.01); *H02K 3/28* (2013.01); *H02K 15/08* (2013.01); *H02K 21/125* (2013.01); *H02K 21/14* (2013.01); *H02K 21/22* (2013.01); *H02K 21/24* (2013.01)

(58) Field of Classification Search
CPC ............ H02K 1/145; H02K 1/16; H02K 1/18; H02K 1/26; H02K 1/27; H02K 3/12; H02K 15/0056; H02K 15/024; H02K 15/04; H02K 21/12; H02K 21/14; H02K 21/26; H02K 53/00
USPC ......................................................... 310/179
See application file for complete search history.

(56) References Cited

U.S. PATENT DOCUMENTS

| | | | | |
|---|---|---|---|---|
| 8,823,241 B2 * | 9/2014 | Jore | ........................ | H02K 21/24 310/179 |
| 8,933,607 B1 * | 1/2015 | Gabrys | .................. | H02K 21/14 310/179 |

(Continued)

*Primary Examiner* — Rashad H Johnson
(74) *Attorney, Agent, or Firm* — Run8 Patent Group, LLC; Peter Miller; Alexander Rodriguez

(57) ABSTRACT

Disclosed are various embodiments for a motor/generator where the stator is a coil assembly and the rotor is a magnetic toroidal cylindrical tunnel or where the rotor is a coil assembly and the stator is a magnetic toroidal cylindrical tunnel, and where the magnetic toroidal cylindrical tunnel comprises magnets having a NNSS or SSNN pole configuration.

20 Claims, 25 Drawing Sheets

Related U.S. Application Data

PCT/US2016/039673, filed on Jun. 27, 2016, which is a continuation-in-part of application No. 15/008,431, filed on Jan. 27, 2016, now Pat. No. 10,476,362.

(60) Provisional application No. 62/185,637, filed on Jun. 28, 2015.

(51) Int. Cl.
      *H02K 21/24*       (2006.01)
      *H02K 21/22*       (2006.01)

(56) References Cited

U.S. PATENT DOCUMENTS

2007/0247008 A1* 10/2007 Miyamoto ............. H02K 41/03
                                                  310/14
2011/0037329 A1* 2/2011 Nord ................... H02K 1/2773
                                                  310/44

* cited by examiner

MULTI-TUNNEL ELECTRIC MOTOR/GENERATOR

RELATED APPLICATIONS

This application is a continuation of U.S. patent application Ser. No. 16/601,529, filed Oct. 14, 2019, entitled "AN IMPROVED MULTI-TUNNEL ELECTRIC MOTOR/GENERATOR," which is a continuation of U.S. patent application Ser. No. 15/848,540, filed Dec. 20, 2017, now U.S. Pat. No. 10,447,103, entitled "AN IMPROVED MULTI-TUNNEL ELECTRIC MOTOR/GENERATOR," which is a continuation of PCT international application number PCT/US2016/039673, filed Jun. 27, 2016, entitled "AN IMPROVED MULTI-TUNNEL ELECTRIC MOTOR/GENERATOR," and claims priority to U.S. patent application Ser. No. 15/008,431, filed Jan. 27, 2016, now U.S. Pat. No. 10,476,362, entitled "AN IMPROVED MULTI-TUNNEL ELECTRIC MOTOR SEGMENT," and claims the benefit of U.S. provisional application No. 62/185,637, filed Jun. 28, 2015, entitled "AN IMPROVED MULTI-TUNNEL ELECTRIC MOTOR/GENERATOR." The disclosures of which are incorporated by reference for all purposes.

This application is commonly owned with the following U.S. patent applications: U.S. patent application Ser. No. 14/866,788, entitled "An Improved Brushless Electric Motor/Generator," filed on Sep. 25, 2015; U.S. patent application Ser. No. 14/866,787, entitled "An Improved Brushed Electric Motor/Generator," filed on Sep. 25, 2015; U.S. application Ser. No. 14/608,232, entitled "An Improved Brushless Electric Motor/Generator," filed on Jan. 29, 2015; and U.S. application Ser. No. 13/848,048, entitled "An Improved DC Electric Motor/Generator with Enhanced Permanent Magnetic Flux Densities" filed on Mar. 20, 2013, and PCT application number PCT/US2016/026776, entitled "An Improved Multi-Tunnel Electric Motor/Generator" filed on Apr. 8, 2016, the disclosures of which are hereby incorporated by reference for all purposes.

TECHNICAL FIELD

The invention relates in general to a new and improved electric motor/generator, and in particular to an improved system and method for producing rotary motion from a electro-magnetic motor or generating electrical power from a rotary motion input.

BACKGROUND INFORMATION

Electric motors use electrical energy to produce mechanical energy, very typically through the interaction of magnetic fields and current-carrying conductors. The conversion of electrical energy into mechanical energy by electromagnetic means was first demonstrated by the British scientist Michael Faraday in 1821 and later quantified by the work of Hendrik Lorentz.

A magnetic field is generated when electric charge carriers such as electrons move through space or within an electrical conductor. The geometric shapes of the magnetic flux lines produced by moving charge carriers (electric current) are similar to the shapes of the flux lines in an electrostatic field. Magnetic flux passes through most metals with little or no effect, with certain exceptions, notably iron and nickel. These two metals, and alloys and mixtures containing them, are known as ferromagnetic materials because they may be used to concentrate magnetic lines of flux.

In a traditional electric motor, a central core of tightly wrapped current carrying material creates magnetic poles (known as the rotor) which spins or rotates at high speed between the fixed poles of a magnet (known as the stator) when an electric current is applied. The central core is typically coupled to a shaft which will also rotate with the rotor. The shaft may be used to drive gears and wheels in a rotary machine and/or convert rotational motion into motion in a straight line.

Generators are usually based on the principle of electromagnetic induction, which was discovered by Michael Faraday in 1831. Faraday discovered that when an electrical conducting material (such as copper) is moved through a magnetic field (or vice versa), an electric current will begin to flow through that material. This electromagnetic effect induces voltage or electric current into the moving conductors.

Current power generation devices such as rotary alternator/generators and linear alternators rely on Faraday's discovery to produce power. In fact, rotary generators are essentially very large quantities of wire spinning around the inside of very large magnets. In this situation, the coils of wire are called the armature because they are moving with respect to the stationary magnets (which are called the stators). Typically, the moving component is called the armature and the stationary components are called the stator or stators.

Rotary motors and generators used today produce or utilize a sinusoidal time varying voltage. This waveform is inherent to the operation of these devices.

With conventional motors a pulsed electrical current of sufficient magnitude must be applied to produce a given torque/horsepower. Horsepower output and efficiency then is a function of design, electrical input power plus losses.

With conventional generators, an electrical current is produced when the rotor is rotated. The power generated is a function of flux strength, conductor size, number of pole pieces and speed in RPM.

In motors or generators, some form of energy drives the rotation and/or movement of the rotor. As energy becomes more scarce and expensive, what is needed are more efficient motors and generators to reduce energy consumption, and hence costs.

SUMMARY

In response to this and other problems, there is presented various embodiments disclosed in this application, including methods and systems of increasing flux density by permanent magnet manipulation using multiple magnetic tunnels. Disclosed are various embodiments for a motor/generator comprising: a toroidal magnetic cylinder comprising a first magnetic tunnel segment radially arranged about an axial axis to form a circular path, wherein the first magnetic tunnel segment comprises: a first side magnetic wall having a magnetic pole orientation that points generally towards an interior of the first magnetic tunnel segment; a first opposing side magnetic wall having a magnetic pole orientation that points generally towards the interior of the first magnetic tunnel segment and positioned along the axial axis a predetermined distance from the first side magnetic wall; a first inner magnetic wall generally spanning between the first side magnetic wall and the first opposing side magnetic wall in a generally axial direction and having a magnetic pole orientation that points generally towards the interior of the first magnetic tunnel segment; a first outer magnetic wall generally spanning between the first side magnetic wall and the first opposing side magnetic wall in a axial direction, positioned radially away from the first inner magnetic wall, and having a magnetic pole orientation that points generally towards the interior of the first magnetic tunnel segment; wherein like magnetic poles of magnets forming the first inner magnetic wall and magnets forming the first side magnetic wall are orientated in an opposite direction from the like poles of magnets forming the first outer magnetic wall and magnets forming the first opposing ring magnetic wall; and a coil assembly positioned within the circular path and adapted to move relative to the toroidal magnetic cylinder.

Other embodiments may include the above wherein the toroidal magnetic cylinder further comprises a second magnetic tunnel segment radially arranged about the axial axis positioned adjacent to the first magnetic tunnel segment to form a circular path, wherein the second magnetic tunnel segment comprises: a second side magnetic wall having a magnetic pole orientation that points generally towards an interior of the second magnetic tunnel segment; a second opposing side magnetic wall having a magnetic pole orientation that points generally towards the interior of the second magnetic tunnel segment and positioned along the axial axis the predetermined distance from the second side magnetic wall; a second inner magnetic wall generally spanning between the second side magnetic wall and the second opposing side magnetic wall in a generally axial direction and having a magnetic pole orientation that points generally towards the interior of the second magnetic tunnel segment; a second outer magnetic wall generally spanning between the second side magnetic wall and the second opposing side magnetic wall in a axial direction, positioned radially away from the second inner magnetic wall, and having a magnetic pole orientation that points generally towards the interior of the second magnetic tunnel segment; wherein like magnetic poles of magnets forming the second inner magnetic wall and magnets forming the second side magnetic wall are orientated in an opposite direction from the like poles of magnets forming the second outer magnetic wall and magnets forming the second opposing ring magnetic wall, and the like magnetic poles of magnets forming the second magnetic tunnel segment are orientated in an opposite direction from the like magnet poles of the magnets forming the first magnetic tunnel segment.

Other embodiments may include the above wherein the coil assembly further comprises: a ring-like core; a plurality of teeth radially positioned about the ring-like core and extending from the ring-like core to form a plurality of slots; and a plurality of coil windings wherein each coil winding in the plurality of winding is positioned within a slot within the plurality of slots.

Other embodiments may include the above further comprising a back iron circuit generally surrounding the toroidal magnetic cylinder.

Other embodiments may include the above further comprising longitudinal grooves defined in the back iron circuit for positioning and supporting the magnets forming the first outer magnetic wall and the first inner magnetic wall.

Other embodiments may include the above further comprising a hub coupled to the coil assembly and a shaft coupled to the hub.

Other embodiments may include the above further comprising a hub coupled to the toroidal magnetic cylinder and a shaft coupled to the hub.

Other embodiments may include the above further comprising an exterior circumferential slot defined in the toroidal magnetic cylinder to allow for passage of a structural support and/or electrical conductors.

Other embodiments may include the above further comprising an interior circumferential slot defined in the toroidal magnetic cylinder to allow for passage of a structural support and/or electrical conductors.

Other embodiments may include the above further comprising a side circular slot defined in the toroidal magnetic cylinder to allow for passage of a structural support and/or electrical conductors.

Other embodiments may include the above further comprising a means for preventing the magnetic flux forces within the interior of the tunnel from escaping through the slots.

Other embodiments may include the above further comprising: a support ring coupled to the coil assembly and partially extending through the side circular slot; a first end plate coupled to the support ring.

Other embodiments may include the above further comprising: a shaft coupled to the toroidal magnetic cylinder; a second end plate coupled rotatably coupled to the shaft; and a means for connecting the first end plate to the second end plate.

Other embodiments may include the above wherein the first inner magnetic wall, the first outer magnetic wall, the first ring magnetic wall and the first opposing ring magnetic wall may be formed from electromagnets.

Other embodiments may include the above wherein a tangential magnetic force is generated on all sides of individual coils in the plurality of coils when the individual coil is positioned within the first magnetic tunnel segment or second magnetic tunnel segment.

Additionally, there may be a method of producing mechanical rotation, the method characterized by: forming a first area of magnetic concentration within a first interior cavity defined by an first outer magnetic cylinder wall having a first magnetic pole facing the interior cavity, a first inner magnetic cylinder wall having a second magnetic pole facing the interior cavity, a first magnetic side wall having a third magnetic pole facing the interior cavity, and a first opposing magnetic side wall having a fourth magnetic pole facing the interior cavity, wherein the first and third magnetic poles are of opposite polarities from the second and fourth magnetic poles; positioning a coil within the first interior cavity; applying a current in a first direction to the coil to cause the coil to rotate relative to the first interior cavity; coupling a longitudinal shaft to the coil such that as the coil rotates, the longitudinal shaft rotates.

Other embodiments may include the above further comprising: forming a second area of magnetic concentration within a second interior cavity positioned circumferentially adjacent to the first interior cavity defined by an second outer magnetic cylinder wall having a fifth magnetic pole facing the interior cavity, a second inner magnetic cylinder wall having a sixth magnetic pole facing the interior cavity, a second magnetic side wall having a seventh magnetic pole facing the interior cavity, and a second opposing magnetic side wall having a eighth magnetic pole facing the interior cavity, wherein the fifth and seventh magnetic poles are of opposite polarities from the sixth and eight magnetic poles; applying a current in a first direction to the coil to cause the coil to move to the second interior cavity; applying a current in a second direction to the coil when the coil is within the second interior cavity to move the coil out of the second interior cavity; and coupling a longitudinal shaft to the coil such that as the coil rotates from the first interior cavity to the second interior cavity, the longitudinal shaft rotates.

Additionally, there may be disclosed a method characterized by: forming a first area of magnetic concentration within a first interior cavity defined by an first outer magnetic cylinder wall having a first magnetic pole facing the interior cavity, a first inner magnetic cylinder wall having a second magnetic pole facing the interior cavity, a first magnetic side wall having a third magnetic pole facing the interior cavity, and a first opposing magnetic side wall having a fourth magnetic pole facing the interior cavity, wherein the first and third magnetic poles are of opposite polarities from the second and fourth magnetic poles; rotating a coil within the first interior cavity; and extracting from the coil a current having a first direction as the coil moves through the first interior cavity.

Other embodiments may include the above further comprising: forming a second area of magnetic concentration within a second interior cavity defined by an second outer magnetic cylinder wall having a fifth magnetic pole facing the interior cavity, a second inner magnetic cylinder wall having a sixth magnetic pole facing the interior cavity, a second magnetic side wall having a seventh magnetic pole facing the interior cavity, and a second opposing magnetic side wall having a eighth magnetic pole facing the interior cavity, wherein the fifth and seventh magnetic poles are of opposite polarities from the sixth and eight magnetic poles, wherein the first through fourth magnetic poles are of an opposite polarity than the fifth through eight magnetic poles; rotating the coil within the second interior cavity; and extracting from the coil a current having a second direction when the coil moves through the second interior cavity.

These and other features, and advantages, will be more clearly understood from the following detailed description taken in conjunction with the accompanying drawings.

It is important to note the drawings are not intended to represent the only aspects of the invention.

DETAILED DESCRIPTION

Specific examples of components, signals, messages, protocols, and arrangements are described below to simplify the present disclosure. These are, of course, merely examples and are not intended to limit the invention from that described in the claims. Well-known elements are presented without a detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding conventional control circuitry, power supplies, or circuitry used to power certain components or elements described herein are omitted, as such details are within the skills of persons of ordinary skill in the relevant art.

When directions, such as upper, lower, top, bottom, clockwise, or counterclockwise are discussed in this disclosure, such directions are meant to only supply reference directions for the illustrated figures and for relative orientation of components in the figures. The directions should not be read to imply actual directions used in any resulting invention or actual use. Under no circumstances, should such directions be read to limit or impart any meaning into the claims except for relative positioning.

Figure 1:
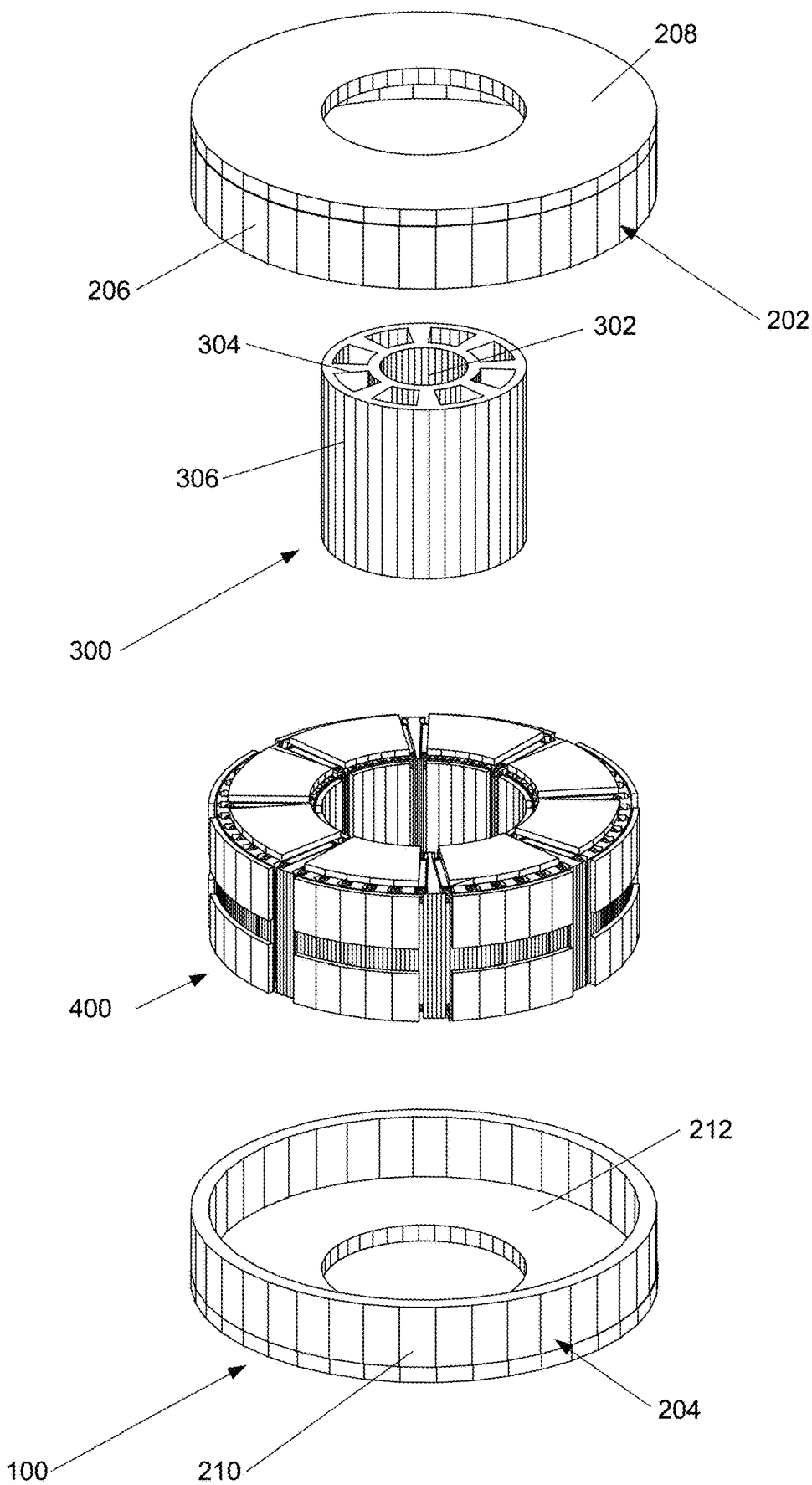
FIG. 1 is an exploded view of one embodiment of a motor/generator component according to certain aspects of the present disclosure.

FIG. 1 is an exploded perspective view of a motor/generator component 100 illustrating a first portion of a back iron circuit 202, a second portion of a back iron circuit 204, a center hub 300, and a magnetic disc assembly 400. The first portion back iron circuit 202 comprises a first cylindrical wall 206 made of back iron material. The first cylinder wall 206 may be coupled to a flat side wall 208 which is also made of back iron material. For purposes of this application the term "back iron" may refer to iron or a soft magnetic material, such as any ferrous compound or alloy, such as stainless steel, any nickel or cobalt alloy, or any laminated metal comprising laminated sheets of such material.

The second portion of the back iron circuit 204 similarly comprises a second cylindrical wall 210 coupled to a flat side wall 212. When assembled, the first portion of the back iron circuit 202 and the second portion of the back iron circuit 204 physically surrounds the center hub 300 and the magnetic disc assembly 400. In other embodiments, the space between the cylindrical walls 206 and 210 define a slot 410 (see FIG. 7B) defined therein to allow the passage of control wires and/or electrical conductors. In yet other embodiments, there may be a slot or gap (not shown) between the cylindrical walls 206 and 210 and the flat side walls 208 and 212, respectively. In certain embodiments, the slot allows for the passage of control wires and/or electrical conductors.

In certain embodiments, the hub 300 comprises an inner hub 302 for coupling to a mechanical load transferring device, such as a shaft (not shown). The hub 300 positions and structurally supports the magnetic disc assembly 400 about the shaft (not shown). In this embodiment, a plurality of radial arms 304 couple the inner hub 302 to an outer hub 306. In certain embodiments, the outer hub 306 also comprises a portion of the back iron circuit for the magnetic disc assembly 400.

Figure 2:
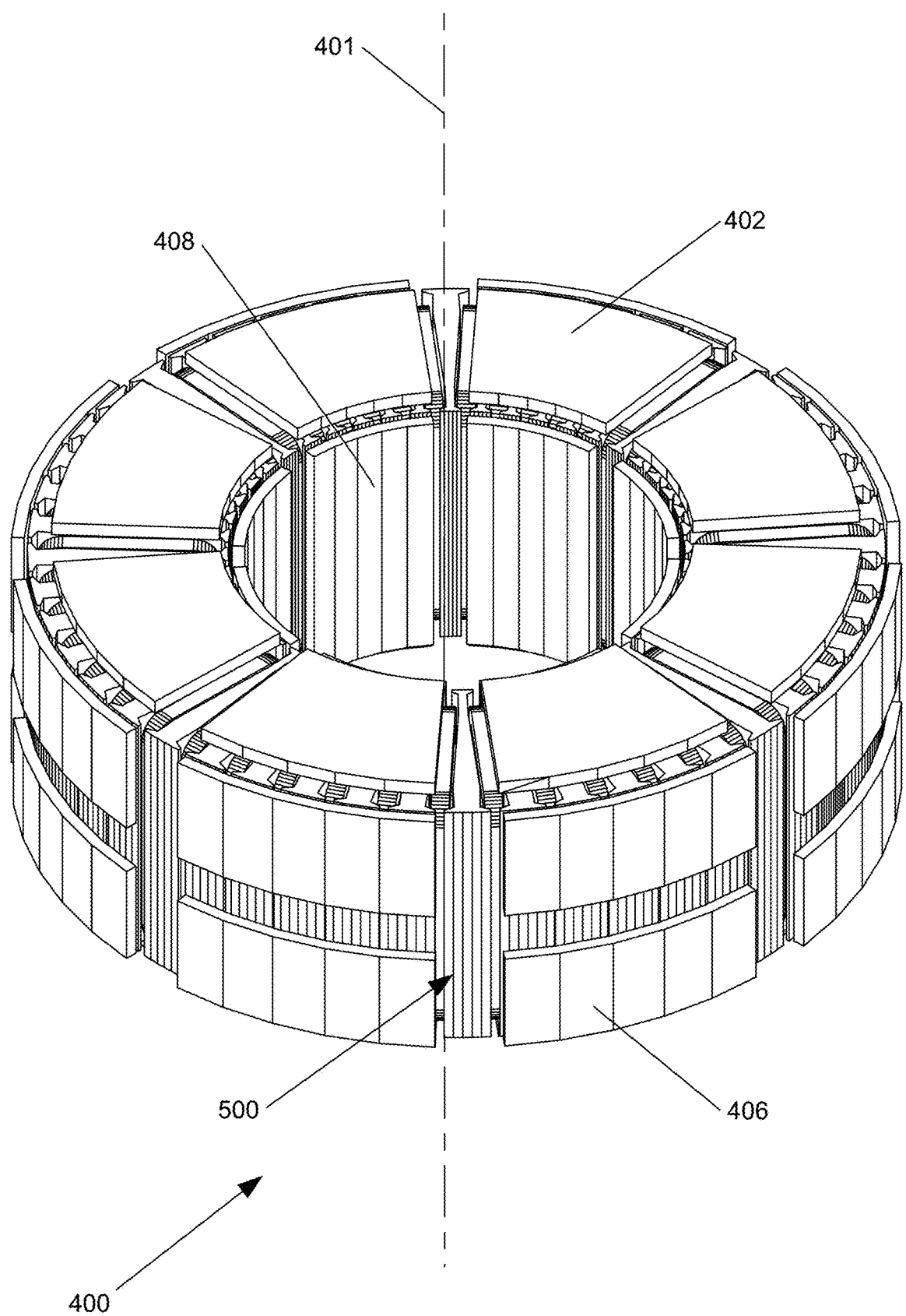
FIG. 2 is a detailed isometric view of a component of the motor/generator component illustrated in FIG. 1.
Figure 3:
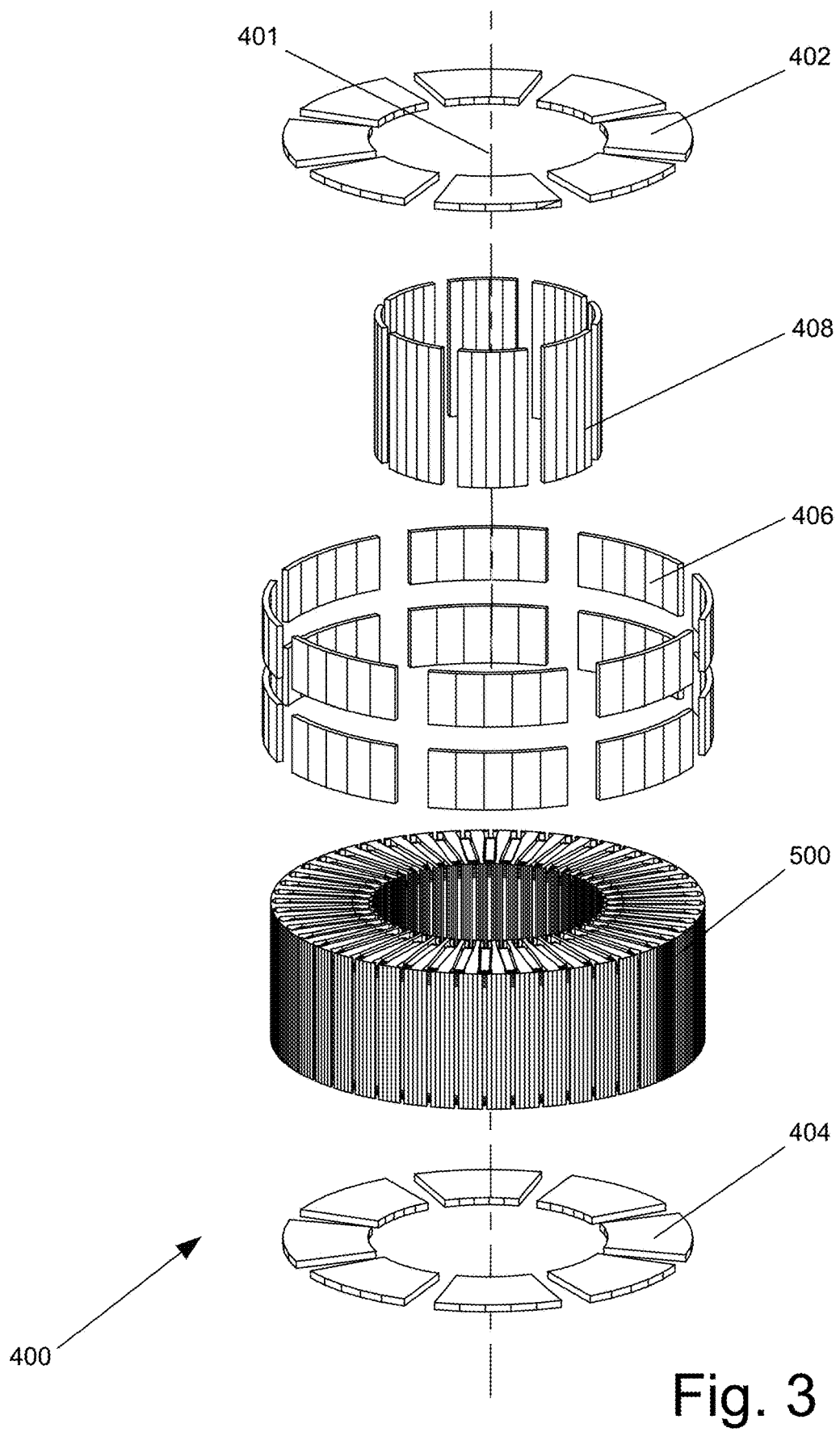
FIG. 3 is an exploded view of the component of FIG. 2.
Figure 5A:
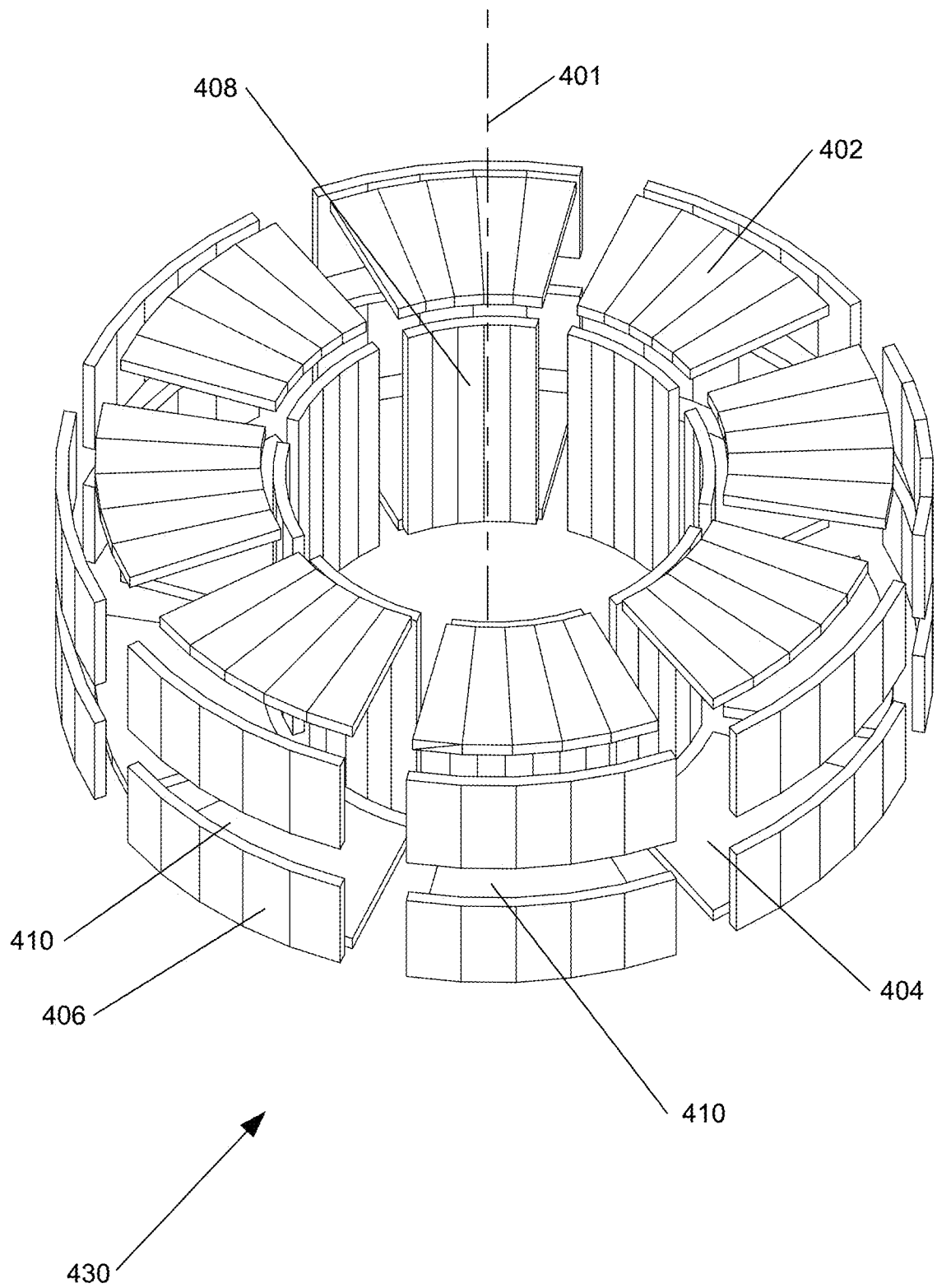
FIG. 5A illustrates a plurality of magnets forming one embodiment of a toroidal magnetic tunnel comprising eight magnetic cylinder segments.

FIG. 2 is a detailed isometric view of the magnetic disc assembly 400. FIG. 3 is an exploded view of the magnetic disc assembly 400. In the embodiment illustrated in FIGS. 2 and 3, with respect to a longitudinal axis 401, there is a top or first side or axial ring of magnets 402. Similarly there is a bottom or second side or axial ring of magnets 404. An outer cylindrical wall or longitudinal ring of magnets 406 is longitudinally positioned between the first axial ring 402 and the second axial ring of magnets 404. An inner cylindrical wall or longitudinal ring of magnets 408 is also longitudinally positioned between the first axial ring 402 and the second axial ring of magnets 408 and laterally positioned within the outer longitudinal ring of magnets 406. When assembled, the magnets forming the axial rings 402-404 and longitudinal rings 408-406 form a toroidal magnetic cylinder, such as illustrated in FIG. 5A.

In certain embodiments, the magnets forming the axial rings 402-404 and longitudinal rings 408-406 discussed herein may be made of out any suitable magnetic material, such as: neodymium, Alnico alloys, ceramic permanent magnets, or electromagnets. The exact number of magnets or electromagnets will be dependent on the required magnetic field strength or mechanical configuration. The illustrated embodiment is only one way of arranging the magnets, based on certain commercially available magnets. Other arrangements are possible, especially if magnets are manufactured for this specific purpose.

A coil assembly 500 is laterally positioned between the outer longitudinal ring 406 and the inner longitudinal ring 408 and is longitudinally positioned between the first axial ring 402 and the second axial ring 404. In certain embodiments, the coil assembly 500 may be a stator. In yet other embodiments, the coil assembly 500 may be a rotor.

Figure 4A:
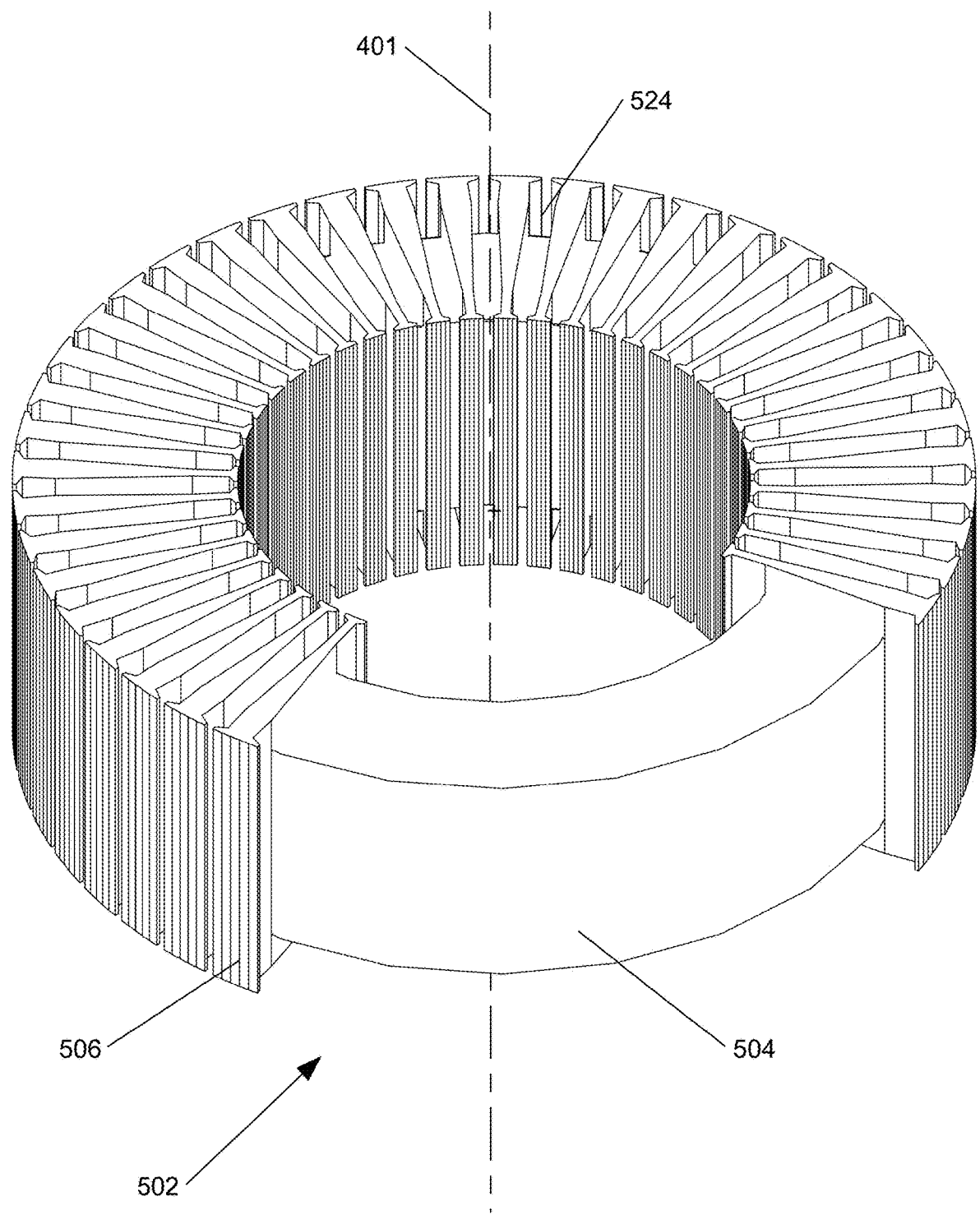
FIG. 4A is an isometric view of a coil assembly illustrating a central iron core and a plurality of teeth extending from the iron core where a portion of the teeth have been removed for clarity.

Turning now to FIG. 4A, there is a partial isometric view of a coil assembly support 502, which in one embodiment, may be a portion of a stator used in conjunction with a rotor formed by the magnetic axial rings 402-404 and magnetic longitudinal cylindrical walls 406-408 and the back iron circuit portions 202 and 204 discussed above. In certain embodiments, the coil assembly support 502 comprises a cylindrical or ring core 504 coupled to a plurality of teeth 506 radially spaced about the ring core. For purposes of clarity, FIG. 4A shows a portion of teeth 506 removed so that the ring core 504 is visible.

In certain embodiments, the ring core 504 may be made out of iron or back iron materials so that it will act as a magnetic flux force concentrator. However, other core materials maybe used when design considerations such as mechanical strength, reduction of eddy currents, cooling channels, etc. are considered. As discussed above, back iron materials may be iron, an iron alloy, laminated steel iron or other soft magnet materials. In some embodiments, the ring core 504 may be hollow or have passages defined therein to allow liquid or air cooling.

Figure 4B:
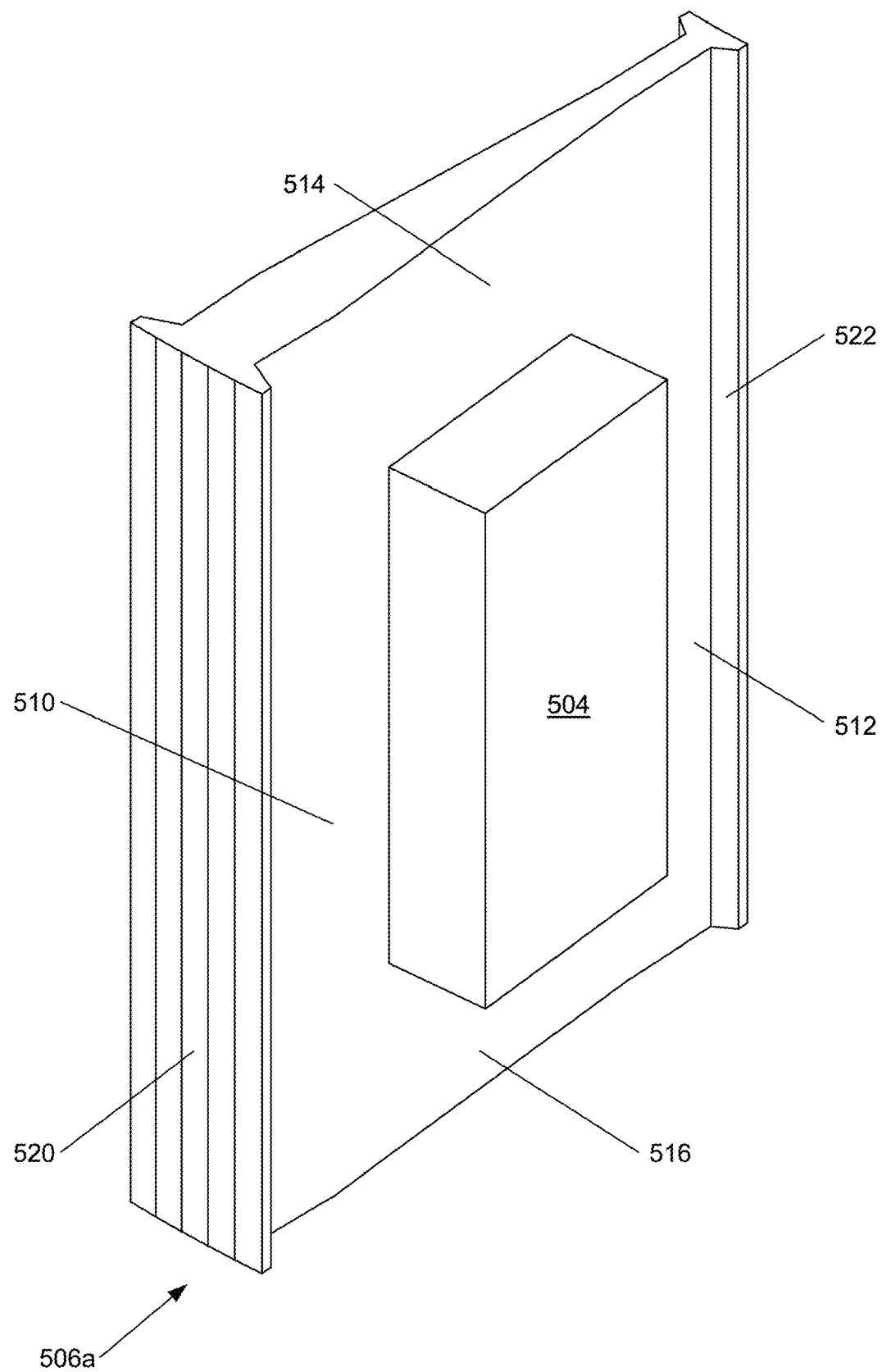
FIG. 4B is a detailed perspective view of a single tooth of the plurality of teeth of FIG. 4A.

One embodiment of an individual tooth 506a and a small portion of the ring core 504 are illustrated in FIG. 4B. The tooth 506a may be made from a material similar to the material forming the core 504, for example, iron or laminated steel. In the illustrated embodiment, each tooth 506a extends from the ring core 504 in radial (e.g., horizontal) and longitudinal (e.g., vertical) directions. Thus, each tooth 506a comprises an outer portion 510 extending radially away from the longitudinal axis 401 (FIG. 3), an inner portion 512 extending radially toward the longitudinal axis 401, a top portion 514 extending in one longitudinal direction, and a bottom portion 516 extending in the opposing vertical or longitudinal direction. The illustrated portion of the ring core 504 is coupled to and supports the individual tooth 506a.

In certain embodiments, an exterior fin 520 couples to an exterior edge of the outer vertical portion 510 and extends outward from the vertical portion 510 in both circumferential (or tangential) directions with respect to the longitudinal axis 401. Similarly, an interior fin 522 couples to an interior edge of the inner portion 512 and extends outward from the portion 512 in both circumferential (or tangential) directions. As used in this disclosure, the term "circumferential direction" means the tangential or rotational direction about an axis, such as axis 401 (See FIG. 4A).

Figure 4C:
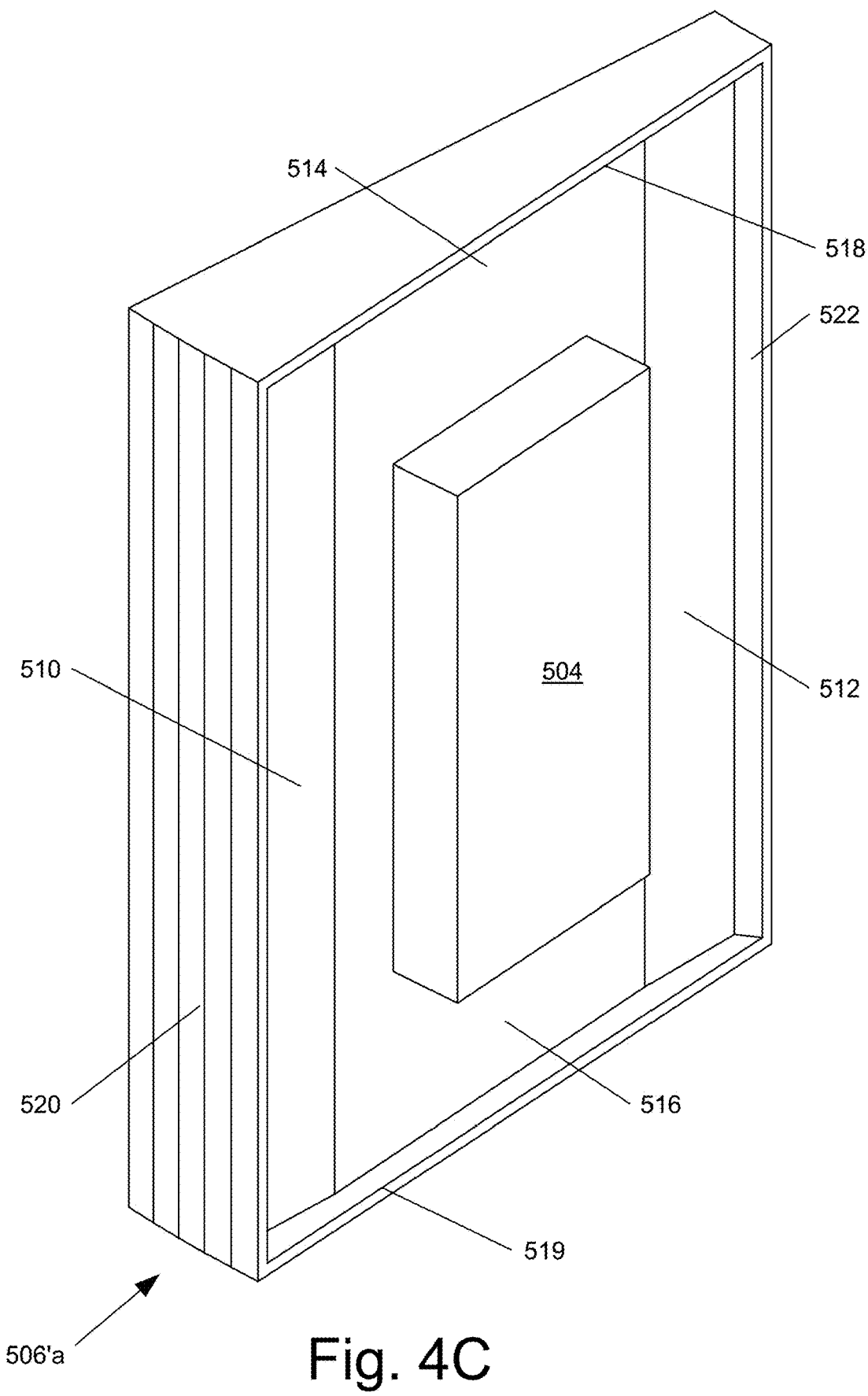
FIG. 4C is a detailed perspective view of an alternative embodiment for the single tooth of the plurality of teeth of FIG. 4A.

An alternative embodiment of an individual tooth 506'a and a small portion of the ring core 504 are illustrated in FIG. 4C. The tooth 506'a is similar to the tooth 506a described above in reference to FIG. 4B except that the tooth 506'a also has horizontal fins extending from the top portion 514 and the lower portion 516. Specifically, a first or top horizontal fin 518 extends in both horizontal circumferential directions from an edge of the top horizontal portion 514. Similarly, a second or bottom horizontal fin 519 extends in both horizontal circumferential directions from an edge of the bottom horizontal portion 516. In other words, the top horizontal fin 518 joins the exterior fin 520 to the interior fin 522. Similarly, the bottom horizontal fin 519 joins the exterior fin 520 to the interior fin 522. From a structural perspective, the thickness of the fins 518 and 519 maybe thicker closer to the joint with the respective horizontal members 514 and 516 and tapers as the fins extend away from the joints.

Figure 4D:
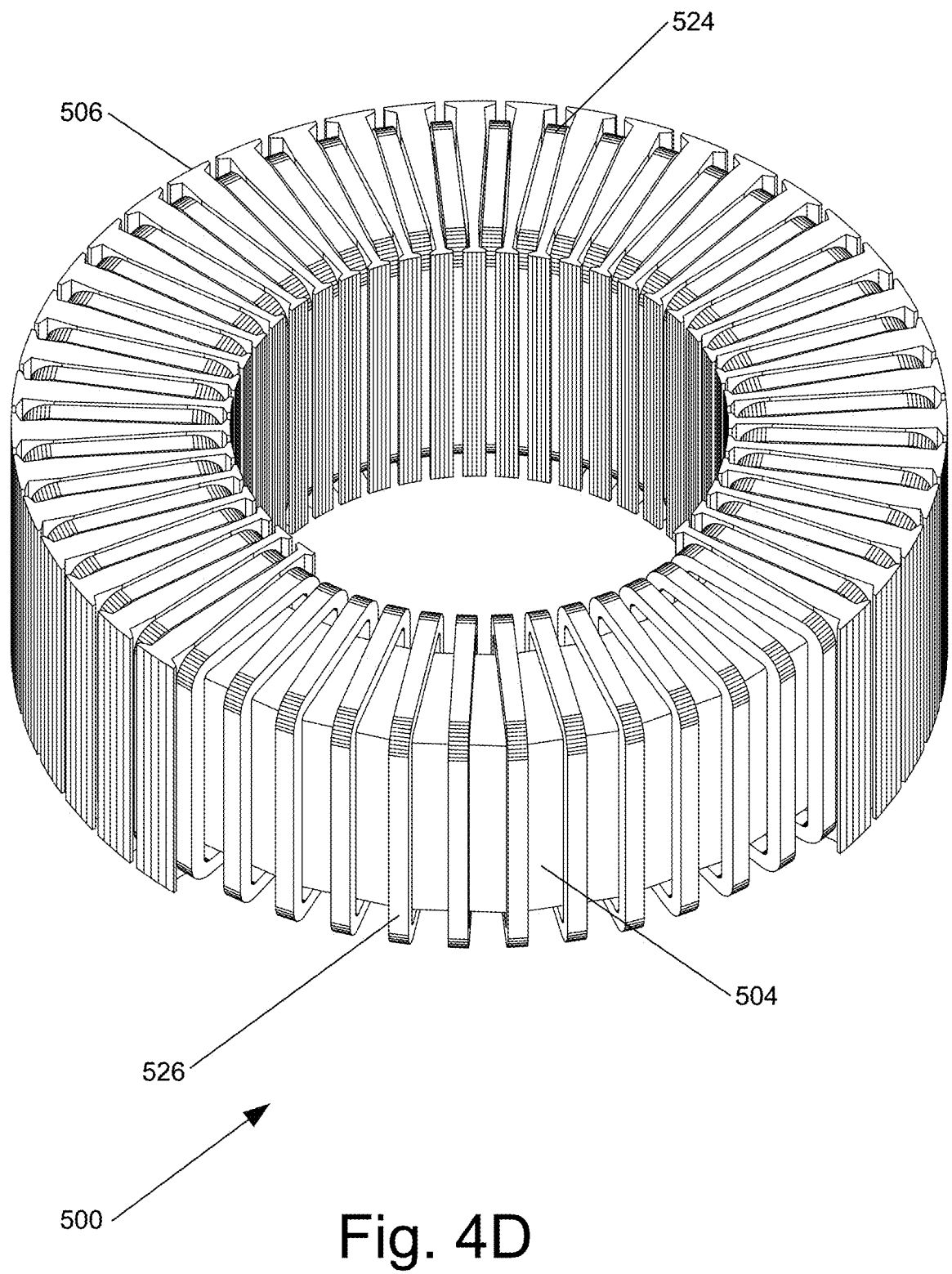
FIG. 4D is an isometric view of the coil assembly of FIG. 4A coupled to a plurality of coil windings.
Figure 4E:
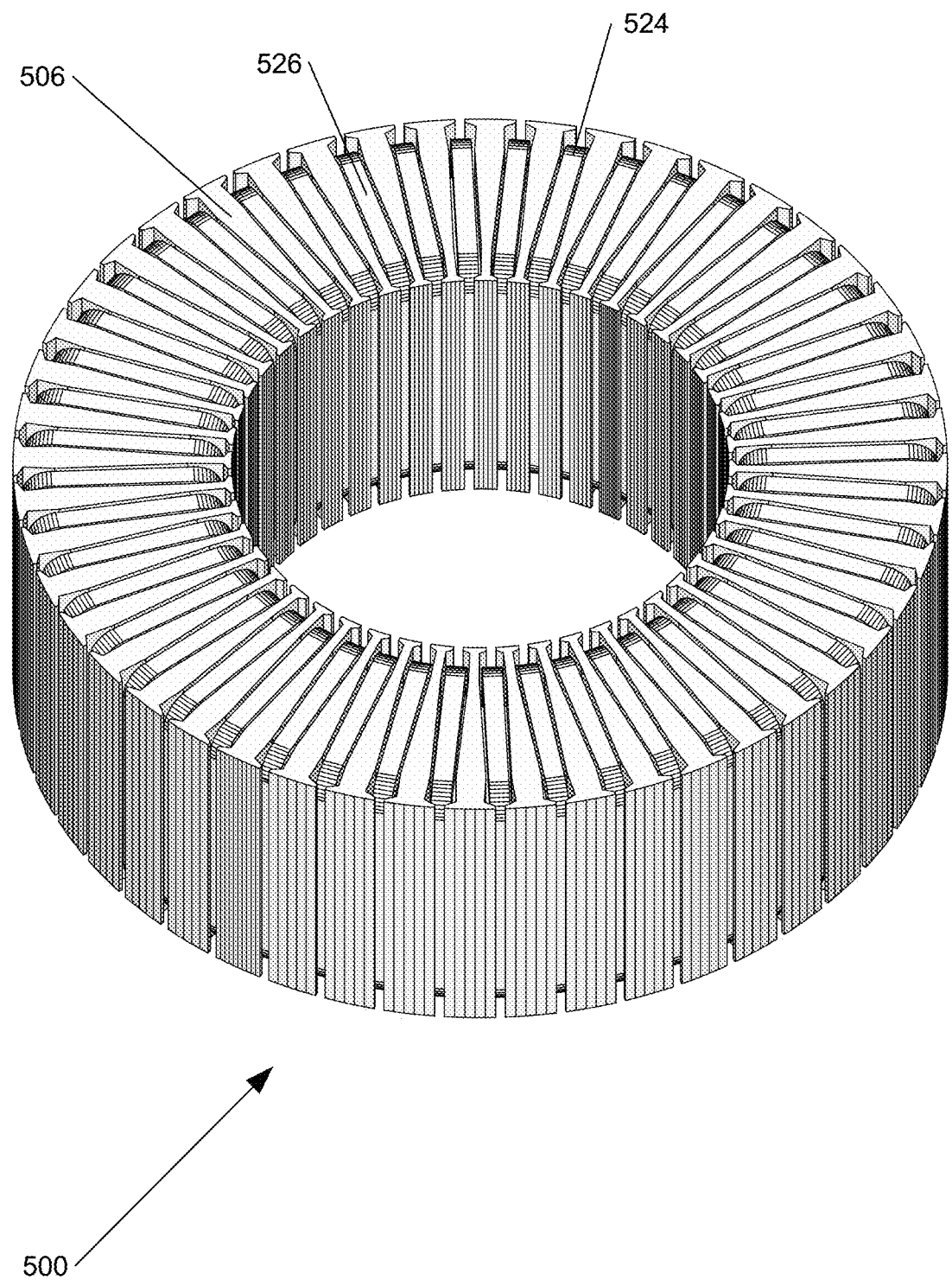
FIG. 4E is an isometric view of the rotor/stator of FIG. 4A coupled to a plurality of coil windings showing all of the rotor/stator teeth.

Adjacent teeth 506 or 506' supported by the core ring 504 form radial slots 524 within the coil assembly support structure 502, as illustrated in FIG. 4A. FIG. 4D (which omits a portion of the teeth 506) illustrates individual coils or coil windings 526 positioned radially about the ring core 504 and within the slots 524 formed by the teeth 506 or 506'. FIG. 4E illustrates a complete coil assembly 500 showing all of the individual teeth 506 and individual coil windings 526 positioned within the individual slots 524.

Each individual coil 526 in the coil assembly 500 may be made from a conductive material, such as copper (or a similar alloy) wire and may be constructed using conventional winding techniques known in the art. In certain embodiments, concentrated windings may be used. In certain embodiments, the individual coils 526 may be essentially cylindrical or rectangular in shape being wound around the ring core 504 having a center opening sized to allow the individual coil 526 to be secured to the core 504.

By positioning the individual coils 526 within the slots 524 defined by the teeth 506 or 506', the coils are surrounded by a more substantial heat sink capabilities of the teeth which, in certain embodiments, can be can incorporate cooling passages directly into the material forming the teeth. This allows much higher current densities than conventional motor geometries. Additionally, positioning the plurality of coils 526 within the slots 524 and between teeth 506 reduces the air gap between the coils. By reducing the air gap, the coil assembly 500 can contribute to the overall torque produced by the motor or generator. In certain embodiments, the lateral fins 518 and 519 (FIG. 4C), the circumferential fins 520 and 522 (FIG. 4B or 4C) of the teeth 506a or 506'a of the coil assembly reduce the air gap between the structure of the coil to allow flux forces to flow from one fin to an adjacent fin when the coils are energized and the coil assembly 500 begins to move relative to the magnetic tunnel. Thus, all portions of the coil support assembly 502 contribute to the overall torque developed by the system.

The number of individual coils 526 can be any number that will physically fit within the desired volume and of a conductor length and size that produces the desired electrical or mechanical output as known in the art. In yet other embodiments, the coils 526 may be essentially one continuous coil, similar to a Gramme Ring as is known in the art.

FIG. 5A is a perspective view of a toroidal magnetic cylinder 430 forming a circular or ring-like magnetic tunnel positioned about the longitudinal axis 401. As described previously, with respect to the longitudinal axis 401, the toroidal magnetic cylinder 430 comprises the top axial ring or side wall magnets 402. Similarly there is a second or bottom axial ring or side wall magnets 404. An outer cylindrical wall or longitudinal ring of magnets 406 is positioned longitudinally between the first axial ring 402 and the second axial ring of magnets 404. Depending on the embodiment, the outer longitudinal ring of magnets 406 may define an axial slot 410 to accommodate a support structure, a cooling mechanism, and/or wires and conductors. An inner cylindrical wall or longitudinal ring of magnets 408 is also longitudinally positioned between the first axial ring 402 and the second axial ring of magnets 408 and axially positioned within the outer longitudinal ring of magnets 406.

In other embodiments, the inner longitudinal ring of magnets 408 may include an axial slot (similar to slot 410, but not shown). In yet further embodiments, the first axial ring 402 or the second axial ring of magnets 404 may include a side circular slot (not shown). Such slots are designed to accommodate a support structure, a cooling mechanism and/or wires or conductors. One advantage of a slot defined within the inner longitudinal ring of magnets 408 (as opposed to the outer longitudinal ring of magnets 406) is that the inner longitudinal ring of magnets 408 produces less torque than the outer ring of magnets 406. Thus, by using the full width of the outer longitudinal ring of magnets 408, greater torque can be produced.

In the embodiment illustrated in FIG. 5A, the toroidal magnetic cylinder 430 comprises eight toroidal magnetic cylinder segments (or magnetic tunnel segments). In other embodiments, there may be two, four, six, ten, twelve segments or more. The number of segments will depend on the particular design and performance characteristics for particular application.

Figure 5B:
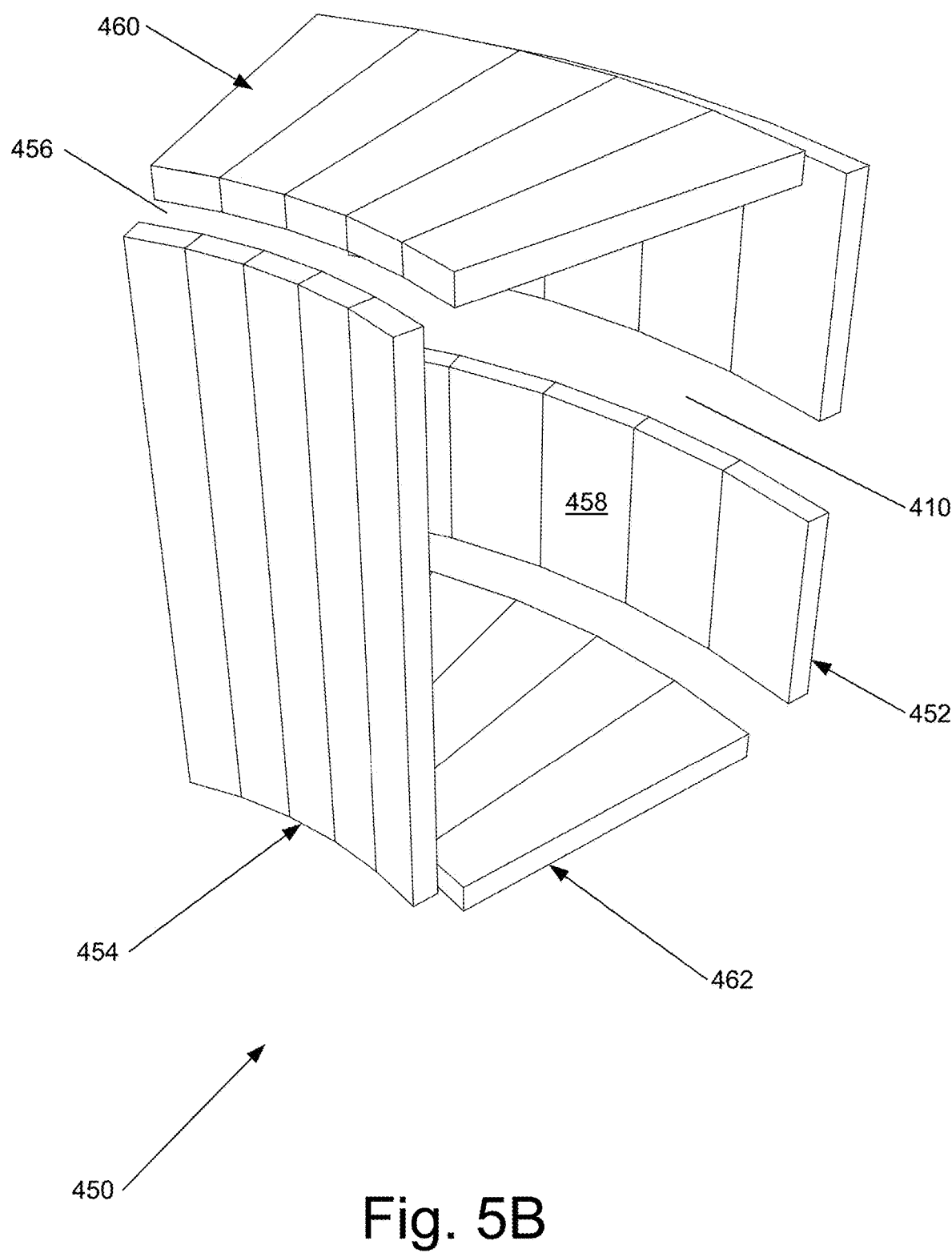
FIG. 5B is a detailed perspective view illustrating one embodiment of a magnetic cylinder segment.

FIG. 5B is a perspective view of a single toroidal magnetic cylinder segment 450 (or a magnetic tunnel segment) which defines a magnetic tunnel 458 or portion of a circular path. As illustrated, the toroidal magnetic cylinder segment 450 has an outer magnetic wall 452 (which is a portion of the outer cylinder wall 406) and an inner magnetic wall 454 (which is a portion of the inner magnetic cylinder wall 408). In addition to the partial cylindrical magnetic walls 452 and 454, there are also be magnetic axial, side or lateral walls 460 and 462 which in this illustrated embodiment may be made of a wedge shape members or magnets. Axial wall 460 may be a portion of the first side or ring wall 402 and axial wall 462 may be a portion of the second side or ring wall 404 or vice versa.

In the illustrated embodiment, there may be slots between the walls, such as slot 456 between the wall 454 and the wall 460. As discussed above, in certain embodiments, there may also be slots within the walls, such as slot 410 which is defined within the wall 452. The individual magnets in the magnetic walls 452, 454, 460, and 462 all have their magnetic poles orientated towards or away from an interior of the tunnel 458 of the toroidal magnetic cylinder segment 450 to form a "closed" magnetic tunnel segment. In other words, the magnetic poles of the magnets forming the outer wall 452 and the inner wall 454 have their magnetic poles orientated to radially point towards the longitudinal axis 401 (FIG. 5A). In contrast, the magnetic poles of the magnets forming the first axial wall 460 and the second axial wall 462 have their magnetic poles orientated parallel with the longitudinal axis 401.

The term "closed magnetic tunnel" as used in this disclosure refers to using a arrangement of the magnets forming the cylinder segment 450 that that "forces" or "bends" the flux forces from one side of the tunnel to the other in a circumferential direction without letting most of the magnetic flux forces escape through a slot or other opening. Thus, the slot widths are limited to keep flux forces from exiting through the slots. In other embodiments, additional magnets may be inserted into the slots (or in proximity to the slots) to keep most of the flux forces channeled to a predetermined or a circumferential direction.

Figure 5C:
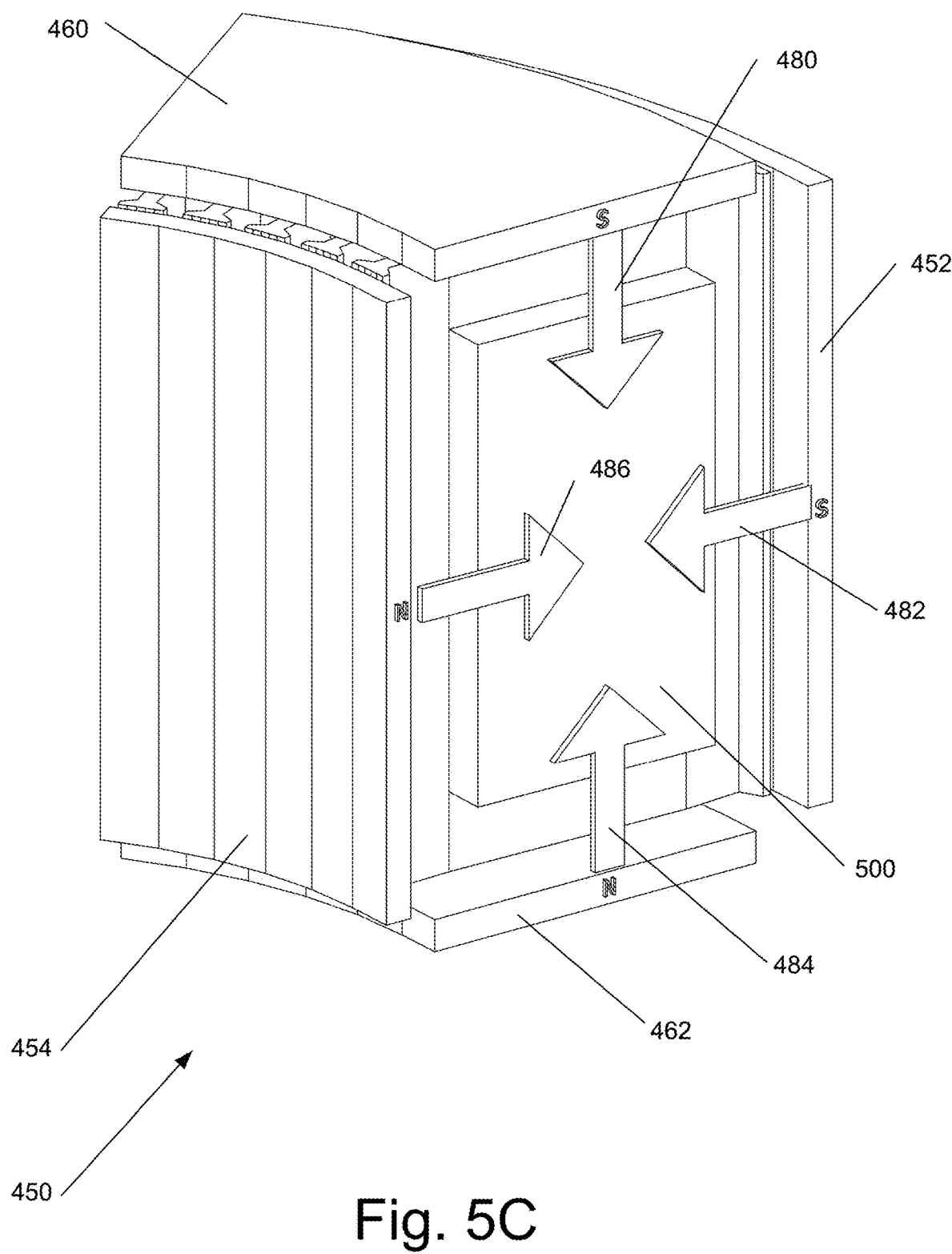
FIG. 5C is a detailed isometric view of one embodiment of a magnetic cylinder segment with a portion of a rotor/stator portion positioned therein illustrating the direction of the flux forces generated from the magnets comprising the magnetic cylinder segments.

FIG. 5C is an isometric view of the toroidal cylinder segment 450 having a portion of the coil assembly 500 positioned within the interior of the segment. The magnetic configuration illustrated in FIG. 5C may be called a "SSNN" configuration because two adjacent magnet faces have their south poles facing inward and the other two adjacent magnetic faces have their north poles facing inward. In other words, the magnets forming the top axial wall 460 and the outer longitudinal wall 452 have their south magnetic poles facing towards the interior of the tunnel 458. (For a matter of drawing interpretation convenience, an "S" is placed on the edge of the axial wall 460 and longitudinal wall 452 to indicate that their south interior poles are facing inward. Thus, the "S" positioned on the edge or side does not represent an actual magnetic pole, but an indicator of the magnetic polarity for the respective interior face.) In contrast, the magnets forming the inner longitudinal wall 454 and the bottom axial wall 462 have their north interior magnetic poles facing towards the interior of the tunnel 458 (Thus, an "N" is placed on the edge of the axial wall 462 and longitudinal 454 to indicate that their north interior poles are facing inward. Again, the "N" positioned on the edge of the axial wall does not represent an actual magnetic pole.) When the coil assembly is positioned within the toroidal cylinder segment 450 as illustrated, the flux lines tend to flow from the north poles of the magnetic walls directly across the coil assembly to the south poles on the opposing side of the magnetic walls.

To illustrate the direction of magnetic forces, arrows will also be used. Thus, the top axial wall 460 is labeled with an "S" on its edge and an arrow 480 pointing towards the center of the toroidal segment 450 to represent the direction of the flux forces generated from the south interior poles of the magnet(s) forming the top axial wall 460. Similarly, the outer longitudinal wall 452 is labeled with an "S" on its edge and an arrow 482 pointing towards the center of the toroidal segment 450 to represent the direction of the flux forces generated from the south interior poles of the magnet(s) forming the outer longitudinal wall 452. In contrast, the bottom axial wall 462 is labeled with an "N" on its edge and an arrow 484 pointing towards the center of the toroidal segment 450 to represent the direction of the flux forces generated from the north interior poles of the magnet(s) forming the bottom axial wall 462. The inner longitudinal wall 454 is labeled with an "N" on its edge and an arrow 486 pointing towards the center of the toroidal segment 450 to represent the direction of the flux forces generated from the north interior poles of the magnet(s) forming the inner longitudinal wall 454.

Figure 5D:
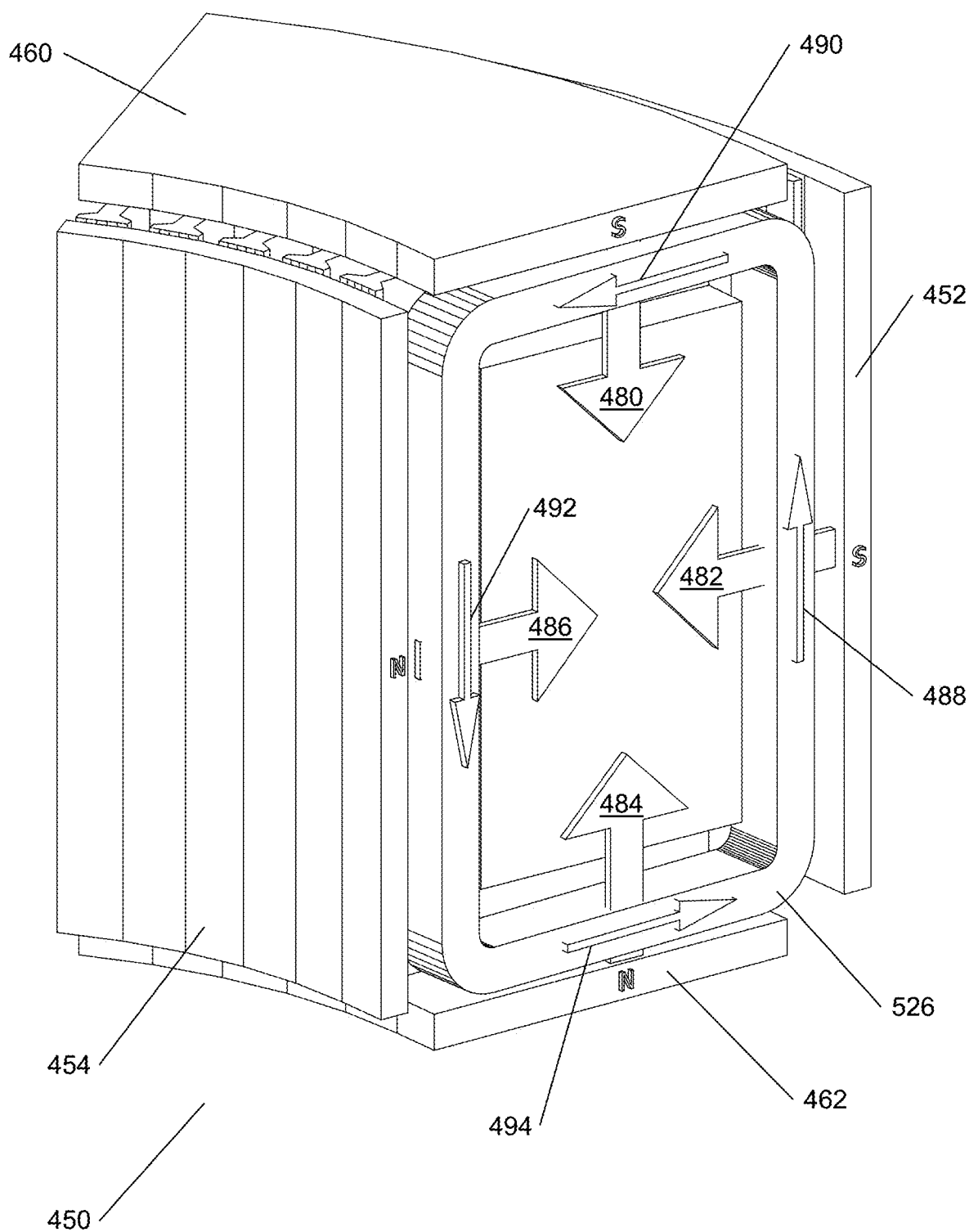
FIG. 5D is a detailed isometric view of the embodiment illustrated in FIG. 5C and a coil winding positioned therein illustrating the direction of the current in the coil winding.

FIG. 5D is an isometric view of the toroidal cylinder segment 450 but with a coil 526a positioned around the portion of the coil assembly 500. When the motor/generator 100 is in motor mode, current from an external source (not shown) is applied to the coils, such as coil 526a. In the illustrated embodiment, the current flows in a counterclockwise manner as illustrated by the arrow 488 which illustrates the current in the coil 526a flowing in an upwards direction. The current then flows in a right to left manner as illustrated by the arrow 490 when the current is in the upper portion of the coil 526a. Similarly, the current flows in a downwardly direction as illustrated by arrow 492 when the current is in a vertical leg of the coil 526a. Finally, the current flows in a left to right manner when the current is in the lower portion of the coil 526a as illustrated by the arrow 494.

Figure 5E:
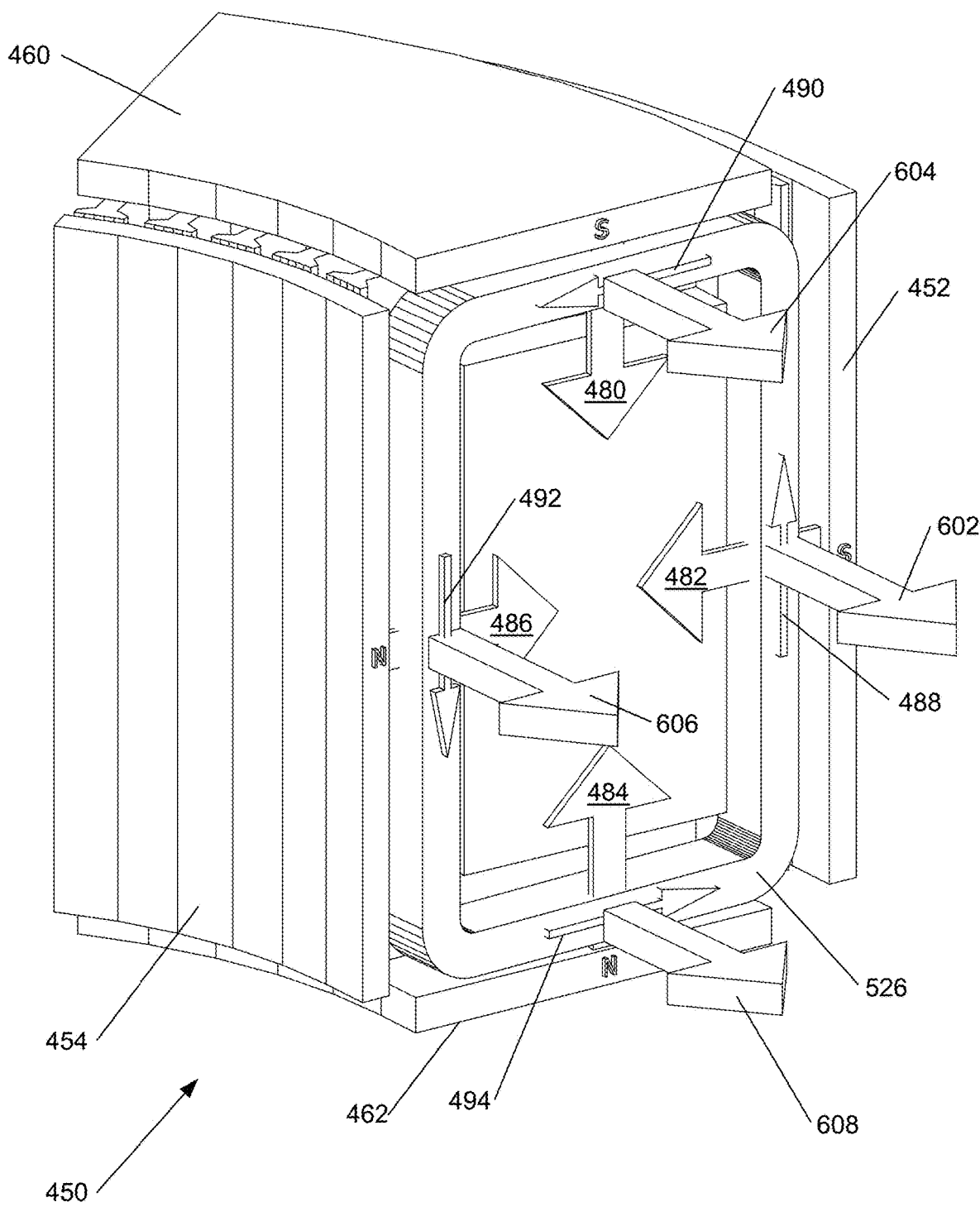
FIG. 5E is a detailed isometric view of one embodiment of a magnetic cylinder segment of FIG. 5D illustrating the direction of force generated by the interaction of the flux forces generated by the magnets and the current in the windings.

FIG. 5E is an isometric view of the cylinder segment 450 with the coil 526a positioned around the portion of the ring core 504 of the coil assembly 500 and the current flowing through the coil as explained above in reference to FIG. 5D. When the magnets forming the outer cylindrical wall 452 generate a flux force in the direction of the arrow 482 and the current in the coil 526a flows in an upward direction relative to the illustration, a magnetic force will be generated in the direction of the arrow 602 according to the right hand rule of magnetic force. Simultaneously, the magnets forming the lateral or top wall 460 generate a flux in the direction of the arrow 480 and the current in the coil 526a flows in a right-to-left direction relative to the illustration, a magnetic force will be generated in the direction of the arrow 604. Additionally, the magnets forming the longitudinal or inner cylindrical wall 454 generate a flux force in the direction of the arrow 486 and the current in the coil 526a flows in a downward direction relative to the illustration, a magnetic force will be generated in the direction of the arrow 606. Finally, the magnets forming the lateral or bottom wall 462 generate a flux force in the direction of the arrow 484 and the current in the coil 526a flows in a left-to-right direction relative to the illustration, a magnetic force will be generated in the direction of the arrow 608.

Note that all the arrows 602, 604, 606, and 608 are in the same direction (i.e., the tangential or circumferential direction relative to the axis 401). Thus, force generated by each portion of the coil 526a will be in the same direction. In other words, the entire coil 526a is used to generate the magnetic forces in the same direction which will tend to move the coil 526a relative to the cylinder segment 450.

In conventional configurations, the opposing poles of the magnets are usually aligned longitudinally. Thus, the magnetic flux lines will "hug" or closely follow the surface of the magnets. So, when using conventional power generating/utilization equipment, the clearances must usually be extremely tight in order to be able to act on these lines of force. By aligning like magnetic poles radially or perpendicular to the coil assembly 500 the magnetic flux forces flow from the surface of the magnets across the coil assembly. This configuration allows for greater tolerances between coils and magnetic surfaces.

One of the advantages of this configuration over conventional motors is that the end turns (in this case the radial section of the coils) are part of the "active section" or force generation section of the motor/generator. In conventional motors, usually only the axial length of the copper conductor is the section that produces power. In conventional motors, the end turns are a penalty, adding weight and losses, but not producing power because the end region fields are not effectively linking the end windings. However, as explained above, the entire coil winding is effectively producing torque due to the side wall or axial magnets which are axially magnetized. Therefore, essentially the entire conductor of the coils is active producing a greater force.

The windings of each coil 526 are generally configured such that they remain transverse or perpendicular to the direction of the relative movement of the magnets comprising the coil assembly 500 and parallel with the longitudinal axis 401. In other words, the coil windings are positioned such that their sides are parallel with the longitudinal axis and their ends are radially perpendicular to the longitudinal axis. The windings are also transverse with respect to the magnetic flux produced by the individual magnets of the rotor at their interior face as described above. Thus, the entire coil winding or windings (including end turns) may be used to generate movement (in motor mode) or voltage (in generator mode).

Figure 6A:
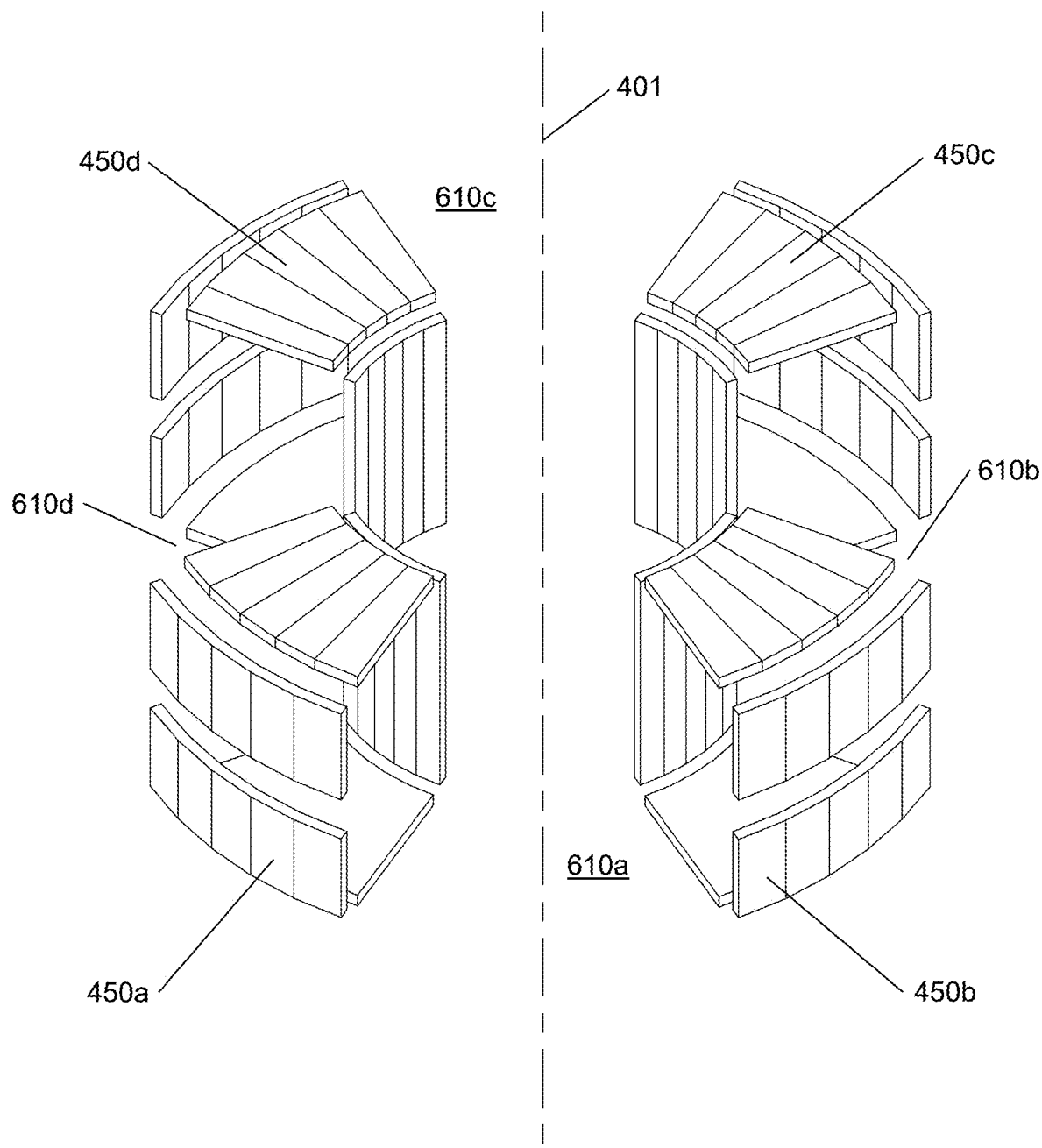
FIG. 6A is a perspective view of four magnetic cylinder segments arranged around a longitudinal axis having similar magnetic pole orientations.

FIG. 6A illustrates four toroidal magnetic cylinder segments 450a, 450b, 450c and 450d arranged circumferentially around a common center or longitudinal axis 401. This arrangement leaves four open spaces 610a, 610b, 610c, and 610d between the respective cylinder segments. Inserting or positioning four additional toroidal magnetic cylinder segments 420a-420d into the spaces 610a-610d results in a complete toroidal magnetic cylinder 430 as illustrated in FIG. 6C. Thus, FIG. 6C illustrates the complete toroidal magnetic cylinder 430 formed from combining the four toroidal magnetic cylinder segments 450a-450d with the toroidal magnetic cylinder segments 420a-420d in an alternating arrangement around the longitudinal axis 401.

The magnets creating the toroidal magnetic cylinder segments 450a-450d are orientated in a specific geometric arrangement as discussed above in reference to FIG. 5E. In other words, the magnets forming the top magnetic walls 460 and outer cylinder wall 452 have their south poles facing inward towards the interior of the cylinder segment. The magnets forming the magnetic bottom wall 462 and the interior cylindrical wall 460 have their north poles facing inward towards the interior of the magnetic cylinder segment. In contrast, the adjacent toroidal magnetic cylinder segments such as the magnetic cylinder segment 420a have their magnetic poles orientated in the opposite direction as illustrated in FIG. 6C.

Figure 6B:
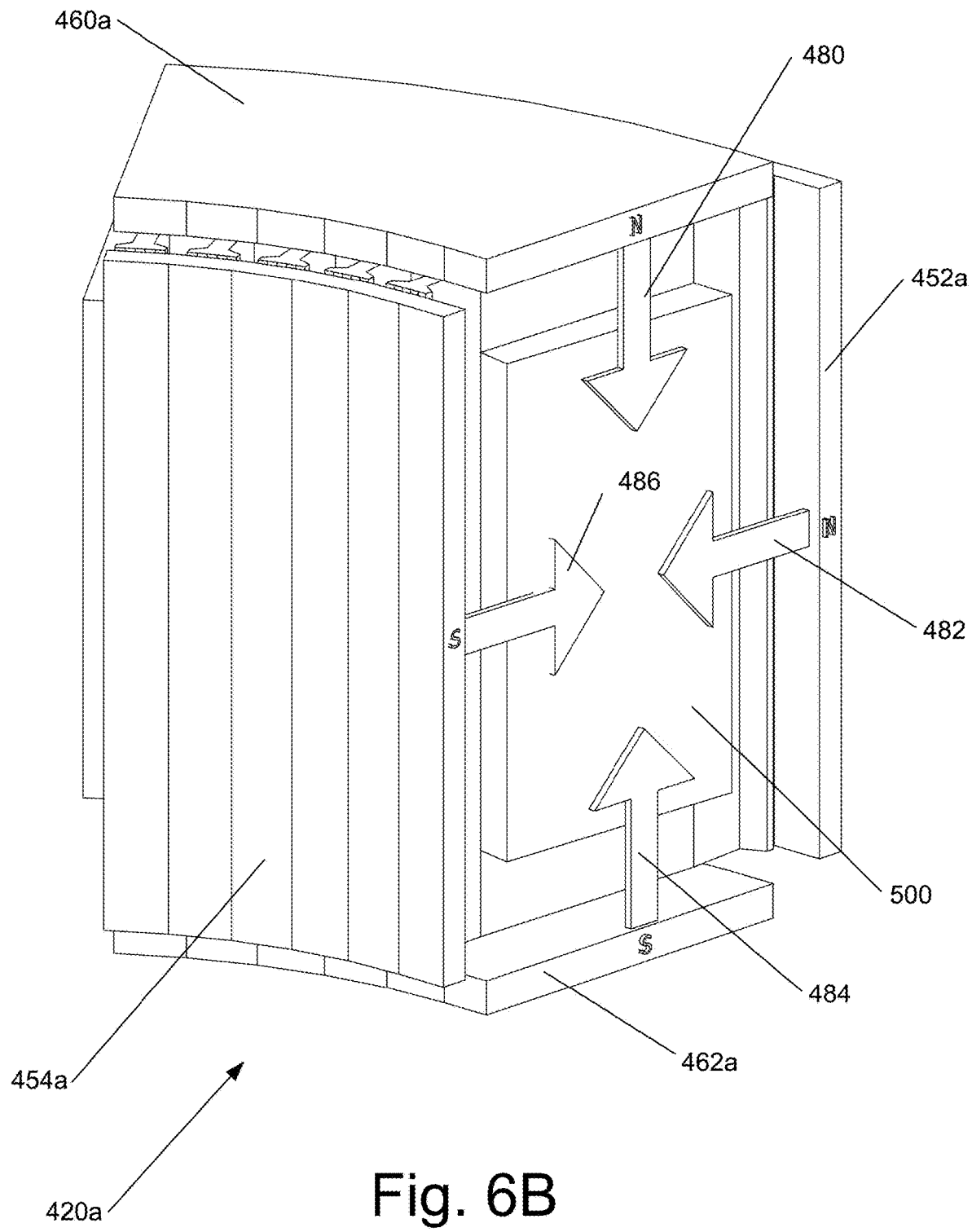
FIG. 6B is a detailed isometric view of one embodiment of a magnetic cylinder segment illustrating the magnets forming the segment have an opposite magnetic polarity to the magnets of the segment illustrated in FIGS. 5C to 5E.
Figure 6C:
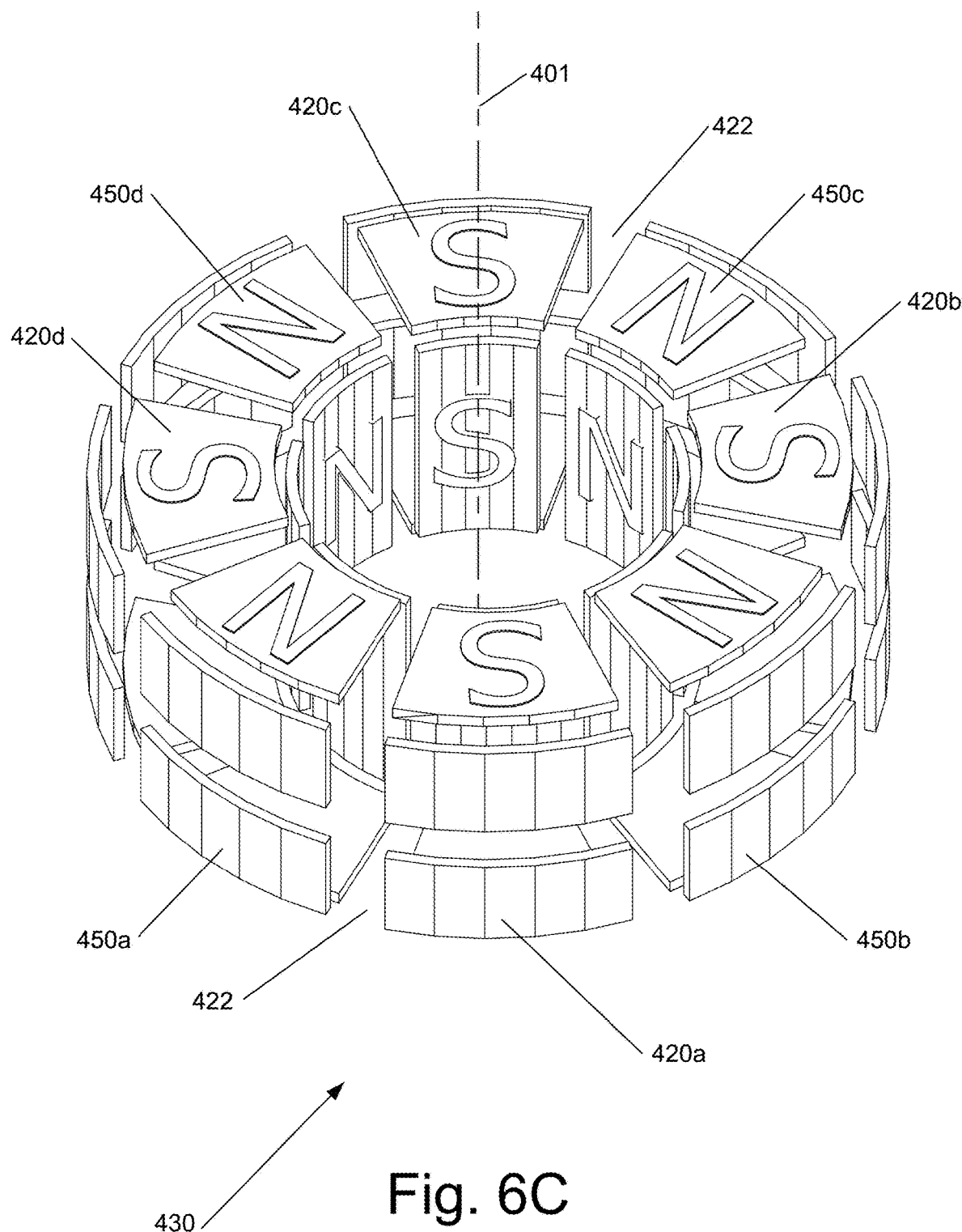
FIG. 6C is an isometric view of the four magnetic cylinder segments with four additional magnetic cylinder segments where the four additional magnetic cylinder segments have a magnetic pole orientation opposite to the first four magnetic cylinder segments.

FIG. 6B illustrates an adjacent toroidal magnetic cylinder segment 420, which could be the toroidal magnetic cylinder segment 420a to 420d. The magnetic cylinder segment 420 is similar to the magnetic cylinder segment 450 discussed above except that the magnetic pole orientation is reversed. In other words, the magnets forming the magnetic walls 460a and 452a have their north poles facing inward towards the interior of the cylinder segment. (As before, "N" is placed on the side of the axial wall 460a and longitudinal 452a to indicate that their north poles are facing inward.) The magnets forming the magnetic walls 462a and 454a have their south poles facing inward towards the interior of the magnetic cylinder segment. (Similarly, an "S" is placed on the side of the axial wall 462a and longitudinal 454a to indicate that their south poles are facing inward.) Thus, the toroidal magnetic cylinder segments 420a-420d have an opposite magnetic orientation relative to the toroidal magnetic cylinder segments 450a-450d.

When the cylinder segments 420a-420d are energized, the current running through the coil windings positioned within the toroidal magnetic cylinder segments 420a-420d also runs in an opposite direction than the current running through the coil windings positioned within the magnetic cylinder segments 450a-450d so that the direction of the generated magnetic force or torque is the same throughout the entire magnetic cylinder 430.

In FIG. 6B, some of magnetic walls are labeled with an "S" representing a facing "South" pole of a magnet wall—as opposed to the magnetic walls labeled with an "N" representing a facing "North" pole of the magnetic wall. Thus, the letters "N" and "S" are superimposed on the exterior faces of the magnetic walls to indicate the direction of magnetic pole polarity of the magnets forming the respective wall. As discussed above, although an eight segment toroidal magnetic cylinder 430 is illustrated in FIG. 6B, in other embodiments, two, three, four, six, ten, etc. partial toroidal magnetic cylinders may be used. The number of partial toroidal magnetic cylinders selected for any given application may be based on engineering design parameters and the particular performance characteristics for an individual application. The scope of this invention specifically includes and contemplates multiple partial toroidal magnetic cylinders having an opposite polarity to the adjacent partial toroidal magnetic cylinders. For simplicity and illustrative purposes, an eight segment toroidal magnetic cylinder is described herein. However, this design choice is in no way meant to limit the choice or number of tunnels for any multi-tunnel toroidal magnetic cylinder.

In certain embodiments, the partial toroidal magnetic cylinders 450a-450d and 420a-420d may be sized to allow radial gaps 422 to form between the partial toroidal magnetic cylinders when the partial toroidal magnetic cylinders are assembled into the complete cylinder 430 as illustrated in FIG. 6B.

Figure 7A:
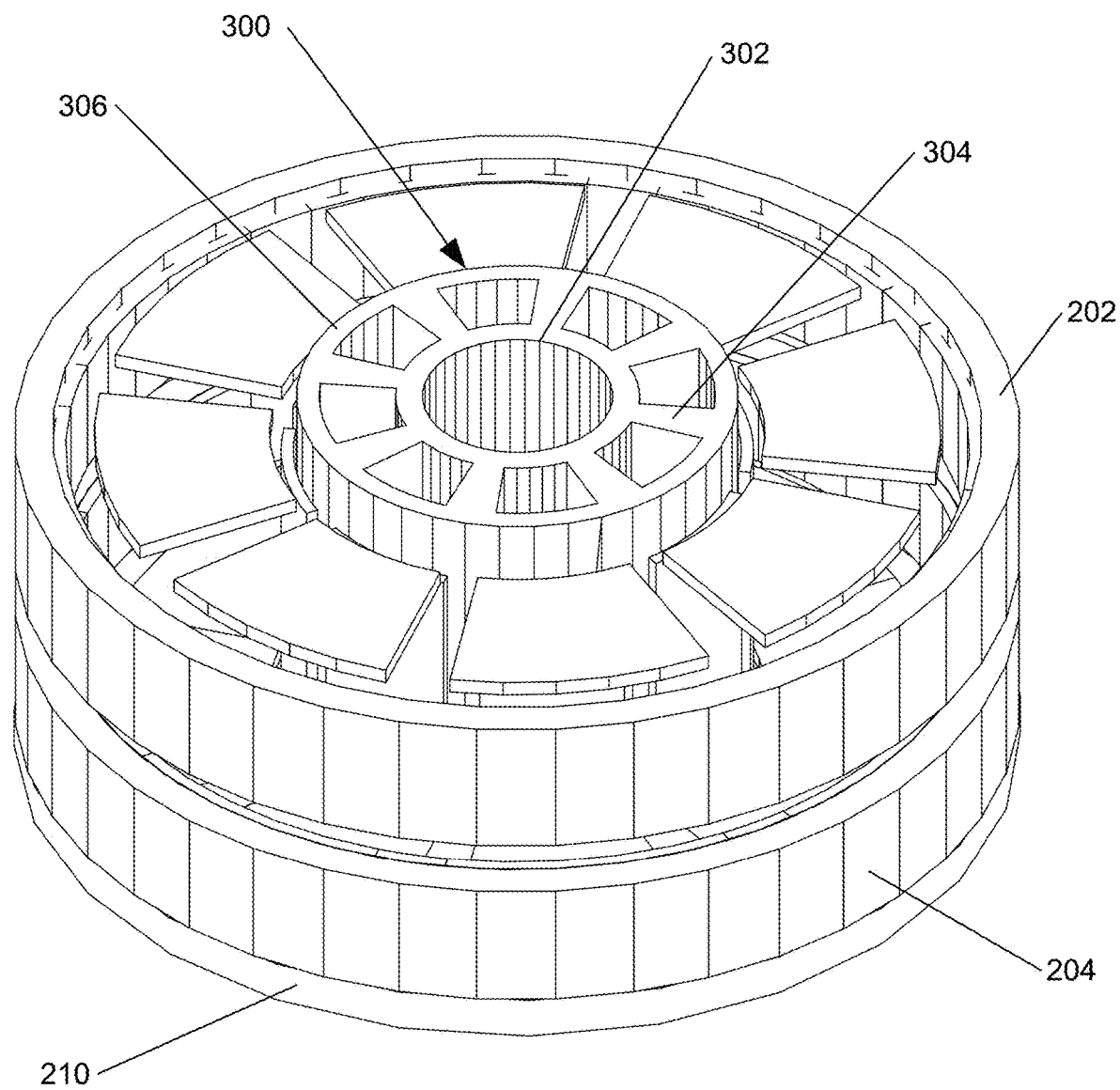
FIG. 7A illustrates the magnetic cylinder of FIG. 6C coupled to a back iron circuit with a portion of the side back iron circuit removed for clarity.
Figure 7B:
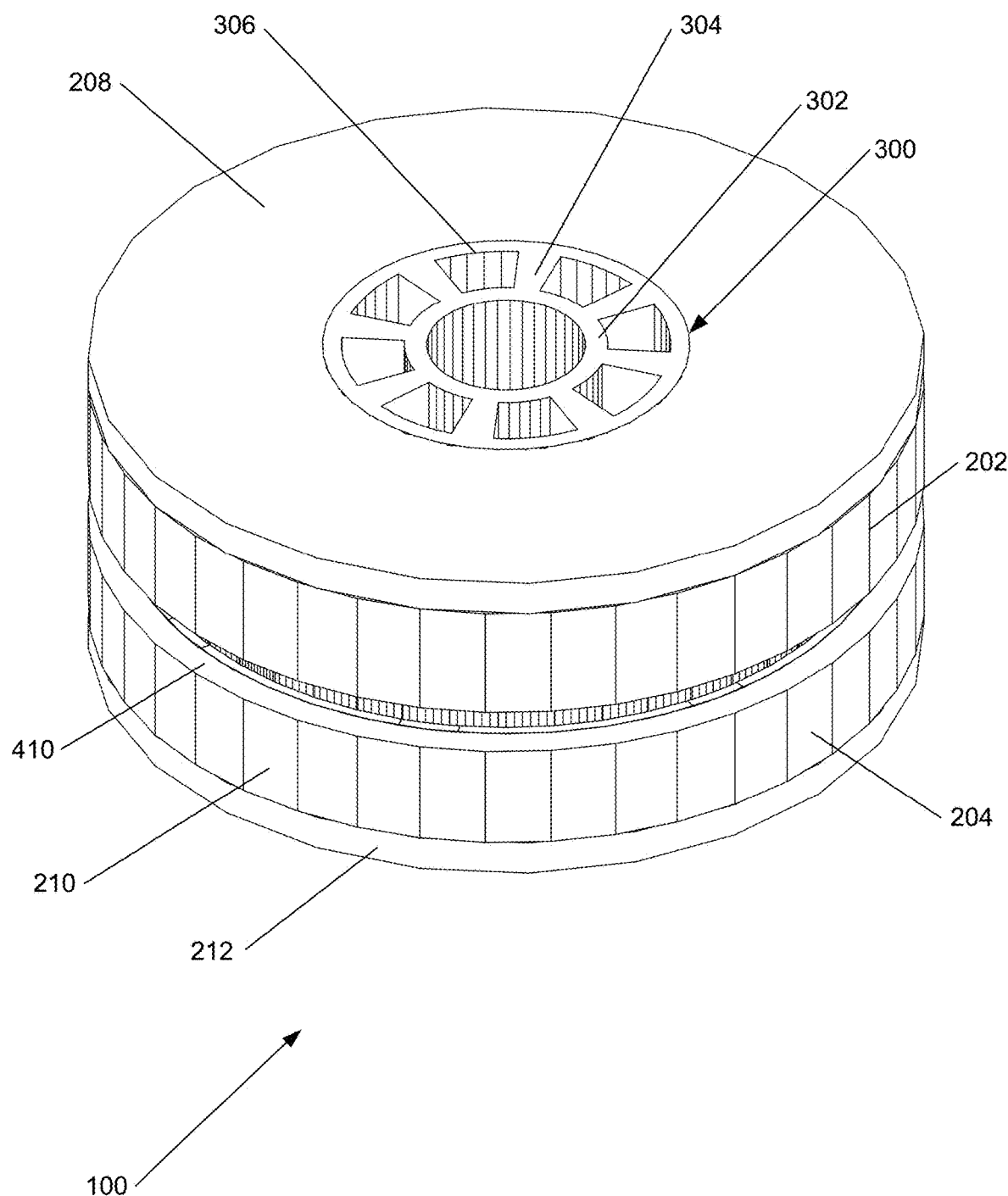
FIG. 7B illustrates the magnetic cylinder of FIG. 6C coupled to a complete back iron circuit.

FIG. 7A illustrates an eight tunnel toroidal magnetic cylinder 430 of FIG. 6B with a portion of the back iron circuit 200 enclosing the magnetic cylinder 430. FIG. 7B illustrates the eight tunnel toroidal magnetic cylinder 430 fully enclosed by the back iron circuit 200. As discussed above, in other embodiments, there may be a slot 410 between the back iron components to allow for the passage of control wires and conductors (not shown).

As discussed above, in the illustrative embodiment, the hub 300 comprises an inner hub 302 for coupling to a mechanical load transferring device, such as a rod (not shown). A plurality of radial arms or spokes 304 structurally connect the inner hub 302 to an outer hub 306. In certain embodiments, the outer hub 306 also comprises a portion of the back iron circuit and thus may be formed from back iron material.

In certain embodiments, the back iron circuit may be used as part of the magnetic flux path. The back iron material channels the magnetic flux produced by the magnetic toroidal cylinder 430 through the back iron material (as opposed to air) to reduce the reluctance of the magnetic circuit. In certain embodiments, therefore, the amount or thickness of the magnets forming the toroidal magnetic cylinder (if permanent magnets are used) may be reduced when using the appropriately designed back iron circuit.

In certain embodiments, the back iron circuit may include a "top" side or axial wall 208 and a "bottom" side or axial wall 210 of back iron material. The circuit may also include the circumferential rings 202 and 204 which may or may not couple to the axial walls 208 and 210, respectively. Thus, in this embodiment, the entire back iron circuit includes the outer cylinder wall 306 of the hub 300, the circumferential rings 202 and 204, and the axial walls 208 and 210 as illustrated in FIGS. 7A and 7B. The back iron circuit combined with the toroidal magnetic cylinder 430 may form a rotor (or a stator depending on the motor/generator configuration).

In order maintain the generated torque and/or power the individual coils 526 in the coil assembly may be selectively energized or activated by way of a switching or controller (not shown). The individual coils 526 in the coil assembly 500 may be electrically, physically, and communicatively coupled to switching or controller which selectively and operatively provides electrical current to the individual coils in a conventional manner.

For instance, the controller may cause current to flow within the individual coil as indicated in FIGS. 5D and 5E when the individual coil is within a magnetic tunnel segment with a NNSS magnetic pole configuration as illustrated in FIGS. 5D and 5E. On the other hand when the same individual coil moves into an adjacent magnetic tunnel segment with a SSNN magnetic pole configuration, the controller causes the current within the individual coil to flow in a direction opposite to that shown in FIGS. 5D and 5E so that the generated magnetic force is in the same direction as illustrated by the arrows 602, 604, 606, and 608 of FIG. 5E.

Turning back to FIGS. 4C and 5E, the individual coils 526 may use toroidal winding without end windings and in some embodiments be connected to each other in series. In other embodiments, a three phase winding may be used where adjacent coils are connected together to form a branch of each phase. For instance, two adjacent coils may be phase A coils, the next two adjacent coils may be phase B coils, and the next two adjacent coils may be phase C coils. This three phase configuration would then repeat for all individual coils 526 within the coil assembly. In one embodiment, there are eight (8) pairs of adjacent phase A coils for a total of 16 phase A coils. Similarly, there are eight (8) pairs of adjacent phase B coils for a total of 16 phase B coils, and there are eight (8) pairs of adjacent phase C coils for a total of 16 phase C coils. Thus, in such an embodiment, there are 48 individual coils.

When the coils are energized, the three phase winding can produce a rotating magnetic field in the air gap around the coil assembly. The rotating magnetic field interacts with the magnetic field generated by the toroidal magnetic tunnel producing torque and relative movement between the coil assembly and the toroidal magnetic tunnel.

In such embodiments, the individual coils 526 may be connected to a brushless motor controller (not shown) to be activated in a manner known in the art. For each phase, the controller can apply forward current, reverse current, or no current. In operation, the controller applies current to the phases in a sequence that continuously imparts torque to turn the magnetic toroidal tunnel in a desired direction (relative to the coil assembly) in motor mode. In certain embodiments, the controller can decode the rotor position from signals from position sensors or can infer the rotor position based on current drawn by each phase.

Figure 8:
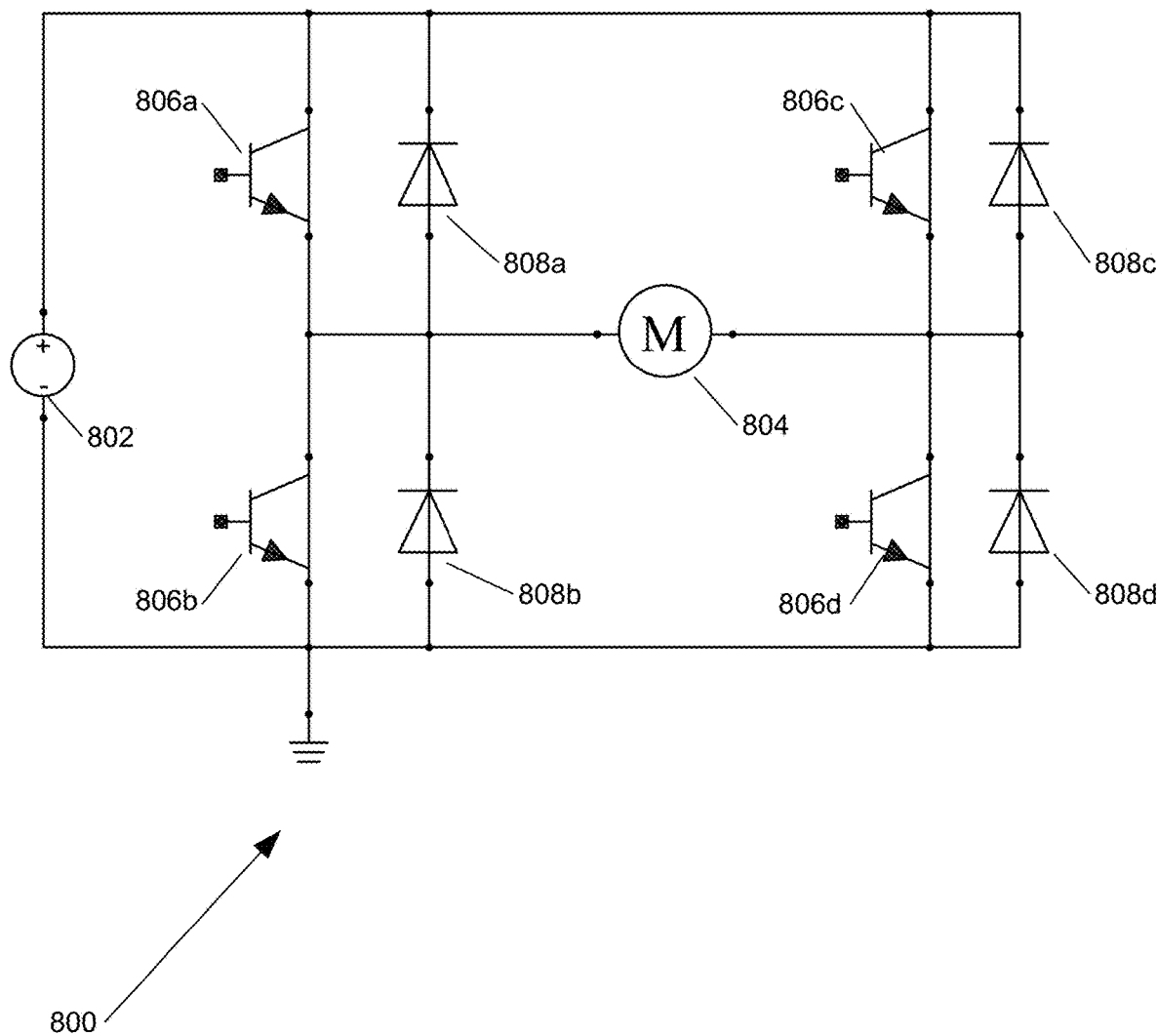
FIG. 8 illustrates an exemplary switch circuit which may be used with certain embodiments of the present invention.

In yet other embodiments, a brushed motor/generator may be used. In such embodiments, one or more commutators (not shown) may be used and positioned, for instance, within the hub 300. In certain embodiments, the number of brushes used may equal the number of toroidal magnetic segments used in the design of the particular motor/generator. For instance, if four toroidal magnetic segments are used, then four brushes may be used. The individual coils 526 in the coil assembly may be connected in series having toroidal wound windings. In a brushed design in motor mode, a simplified switching circuit 800 such as illustrated in FIG. 8 is all that is necessary to switch the current direction as the coils enter and exit the respective toroidal magnetic segment. As illustrated in FIG. 8, a power source 802 is electrically coupled to a brushed motor 804 via four pairs of transistors 806a-806d and diodes 808a-808d as is known in the art to switch the current of the four toroidal magnetic segments.

A Motor/Generator Embodiment

Figure 9A:
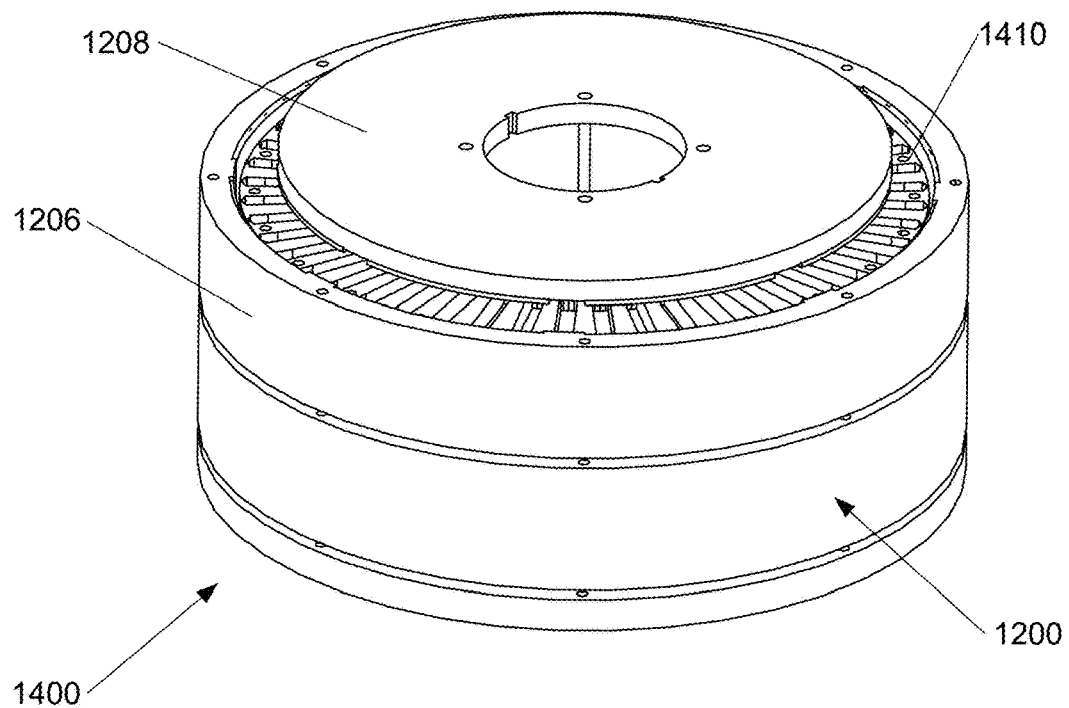
FIG. 9A illustrates an alternative magnetic cylinder coupled to a back iron circuit.

FIG. 9A illustrates a magnetic disc assembly 1400 (similar to the magnetic disc assembly 400 of FIGS. 1 and 2) enclosed by a back iron circuit 1200. The back iron circuit 1200 is similar to the back iron circuit 200 discussed above. As opposed to the embodiment discussed above in reference to FIGS. 7A and 7B which has a circumferential slot 410 defined in between the first cylindrical wall 206 and the second cylinder wall 210 of the back iron circuit 200, the toroidal magnetic cylinder 1400 has a side slot 1410 defined between a first side or top wall 1208 and a first cylinder wall 1206 of the back iron circuit 1200. The side slot 1410 may be used to allow for a structural side support (e.g., an extension ring) in addition to the passage of control wires and conductors. For brevity and clarity, a description of those parts and components which are identical or similar to those described in connection with the embodiment illustrated in the above figures will not be repeated here. Reference should be made to the foregoing paragraphs with the following description to arrive at a complete understanding of alternative embodiments.

Figure 9B:
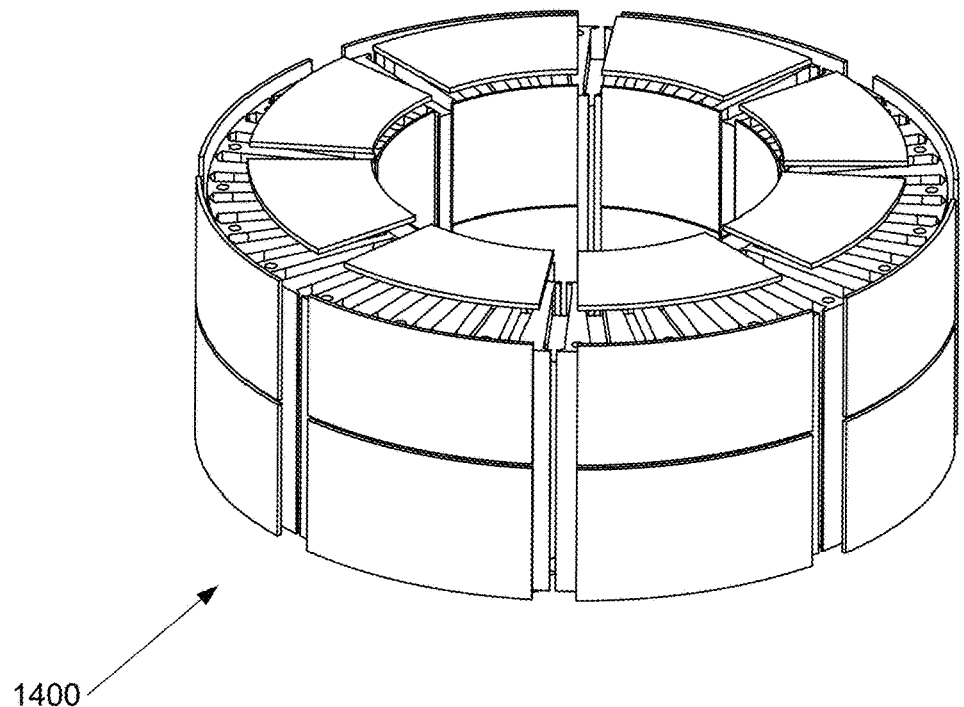
FIG. 9B is an assembled view of the alternative magnetic cylinder.

FIG. 9B illustrates the magnetic disc assembly 1400 with the back iron circuit 1200 removed for clarity. Although eight segments are illustrated in FIG. 9B, the toroidal magnetic cylinder 1400 may be made of any number of segments—as explained above in reference to the toroidal magnetic cylinder 430.

Figure 9C:
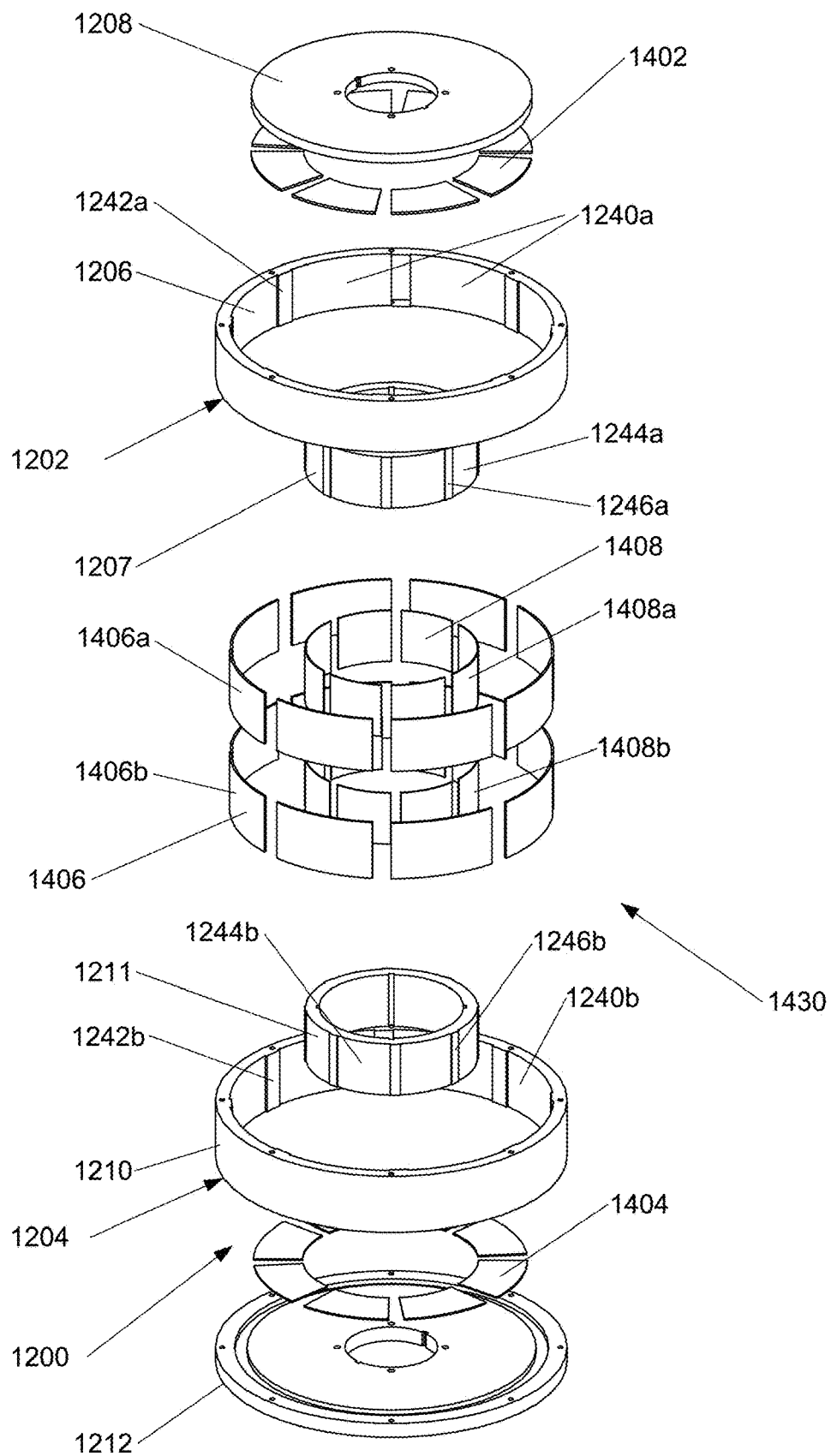
FIG. 9C is an exploded view of the alternative magnetic cylinder of FIG. 9B.

FIG. 9C is an exploded isometric view of the back iron circuit 1200 and the magnets forming a toroidal magnetic cylinder 1430 (which is similar to the toroidal magnetic cylinder 430 discussed above). In this embodiment, the back iron circuit 1200 comprises a first portion 1202 and a second portion 1204. The first portion of the back iron circuit 1200 comprises the side or top wall 1208, a first circumferential outer wall or ring 1206, and a first interior wall or ring 1207. The second portion 1204 of the back iron circuit 1200 comprises the side or bottom wall 1212, the second circumferential outer wall or ring 1210, and a second interior wall or ring 1211.

The toroidal magnetic cylinder 1430 is formed by a first axial ring or side wall 1402, a second axial ring or side wall 1404, an outer cylindrical wall or longitudinal ring of magnets 1406, an inner cylindrical wall or longitudinal ring of magnets 1408. When assembled, the outer cylindrical wall 1406 and the inner cylindrical wall 1408 are longitudinally positioned between the first axial ring 1402 and the second axial ring of magnets 1404. Additionally, the inner cylindrical wall 1408 is laterally positioned within the outer longitudinal ring of magnets 1406. In the illustrated embodiment of FIG. 9C, the outer cylindrical wall 1406 is composed of two portions or "rings"—a first outer ring 1406a and a second outer ring 1406b. Similarly, the inner cylindrical wall 1408 is composed of two portions or inner rings: a first ring 1408a and a second ring 1408b.

As discussed in previous embodiments, each outer ring 1406a and 1406b comprises a plurality of curved magnets. A plurality of inner longitudinal grooves 1240a are defined and radially spaced around an inner surface 1242a of the first outer cylinder wall 1206. The plurality of outer magnets forming the first portion 1406a of the outer magnetic wall 1406 are sized to fit within the plurality of inner longitudinal grooves 1240a. Similarly, a plurality of inner longitudinal grooves 1240b are defined and radially spaced around an inner surface 1242b of the second outer cylinder wall 1210. The plurality of outer magnets forming the second portion 1406b of the outer magnetic wall 1406 are sized to fit within the plurality of inner longitudinal grooves 1240b.

Each inner magnetic ring portion 1404a and 1404b also comprises a plurality of curved magnets. A plurality of outer longitudinal grooves 1244a are defined and radially spaced around an outer surface 1246a of the first inner cylinder wall 1207 of the back iron circuit 1200. The plurality of inner magnets forming the first portion 1408a of the inner magnetic wall 1408 are sized to fit within the plurality of outer longitudinal grooves 1244a. Similarly, a plurality of outer longitudinal grooves 1244b are defined and radially spaced around an outer surface 1246b of the second outer cylinder wall 1211. The plurality of inner magnets forming the second portion 1408b of the inner magnetic wall 1408 are sized to fit within the plurality of outer longitudinal grooves 1244b.

Thus, the plurality of grooves 1240a, 1240b, 1244a and 1244b positioned and structurally support the plurality of magnets forming the outer cylindrical wall 1406 and the inner cylindrical wall 1408.

Figure 10A:
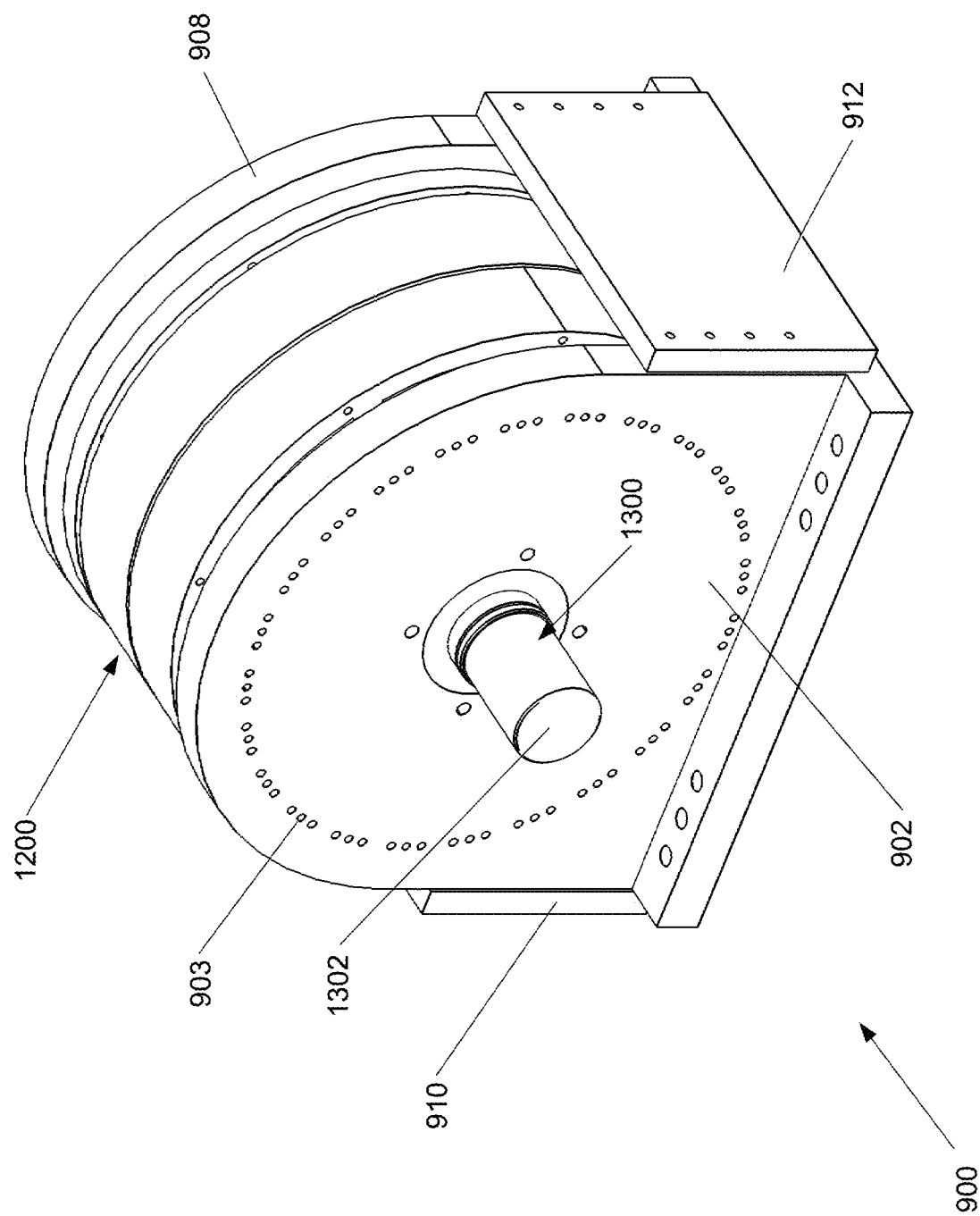
FIG. 10A is an assembled view of a motor/generator incorporating the alternative magnetic cylinder.
Figure 10B:
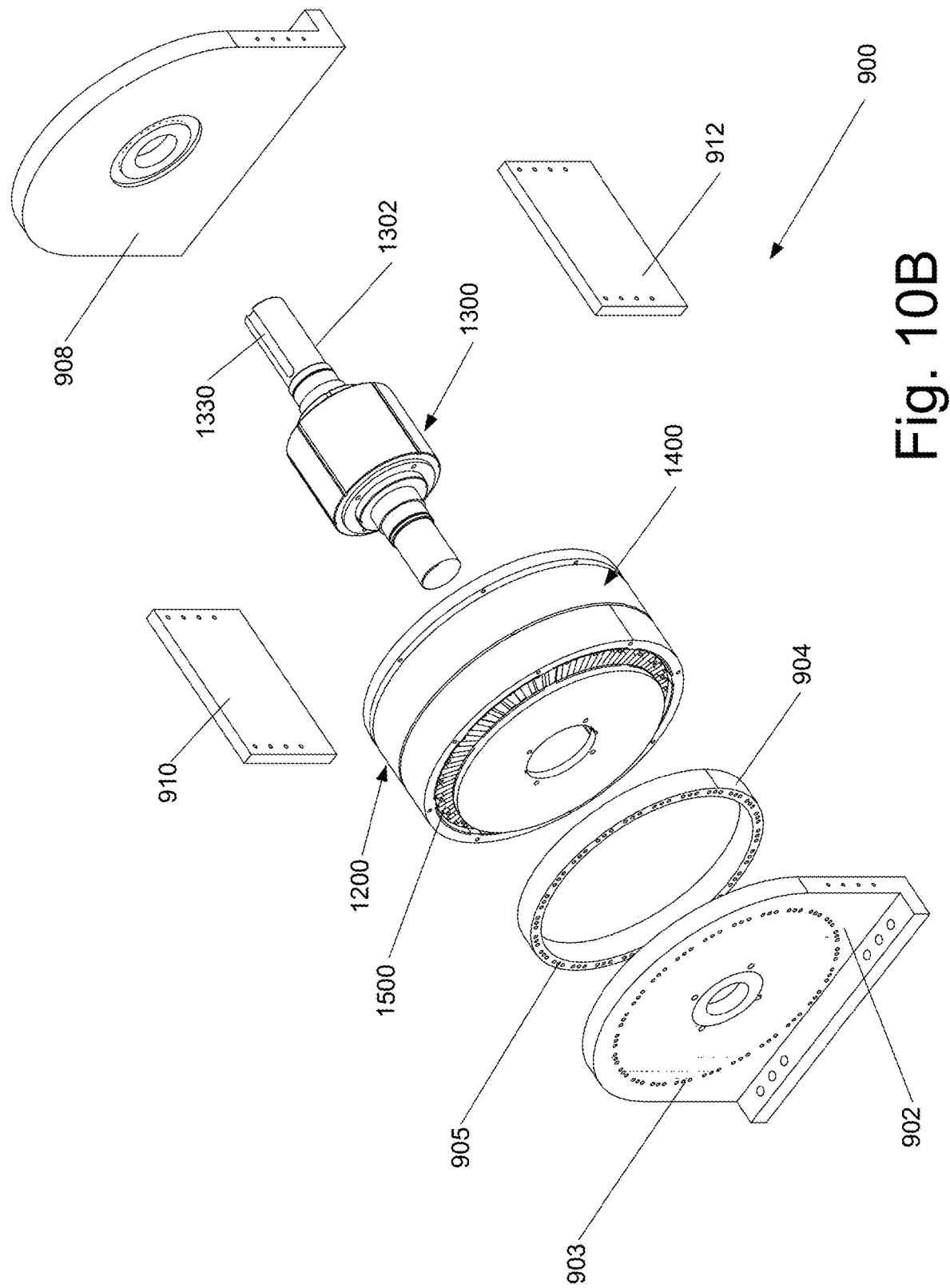
FIG. 10B is an exploded view of a motor/generator incorporating the alternative magnetic cylinder.

FIG. 10A is an isometric assembled view of the system 900 using the magnetic disc assembly 1400 and back iron circuit 1200 (FIGS. 9A to 9C). In contrast, FIG. 10B is an exploded isometric view of the system 900. Referring now to both FIGS. 10A and 10B, the magnetic disc assembly

1400 is used as a component in the system 900. The magnetic disc assembly 1400 includes a coil assembly 1500 (which is similar to the coil assembly 500 discussed above). Depending on the configuration, the system 900 can be either an electric motor or an electric generator.

In certain embodiments, the system 900 includes a stator side end plate 902 and an extension or support ring 904 which fixedly couples the coil assembly 1500 to the stator side end plate 902. The stator side end plate 902 includes a series of apertures 903 arranged in a circular configuration. Similarly, the support ring 904 also has a series of apertures 905 defined in a circular configuration which are sized and spaced to align the apertures 903 of the stator side end plate 902 when the system 900 is assembled. Screws, bolts or other fasteners may extend through some of the apertures 903 and 905 to secure the stator side end plate 902 to the coil assembly 1500.

When assembled, an end of a rotor shaft 1302 extends through the stator side end plate 902 as illustrated in FIG. 10A. The rotor hub 1300 couples to the rotor shaft 1302 and supports the back iron circuit 1200, which in turn supports the toroidal magnetic cylinder 430 (not visible in FIGS. 10A and 10B). The opposing end of the rotor shaft 1302 is supported by a rotor side end plate 908. When assembled, a pair of side plates 910 and 912 couple the stator side end plate 902 to the rotor side end plate 908 as illustrated in FIG. 10A. As is known in the art, the rotor shaft 1302 is a mechanical load transferring device that either inputs a mechanical rotation force into the system when in generator mode or produces a mechanical rotational force when the system is in motor mode.

Figure 10C:
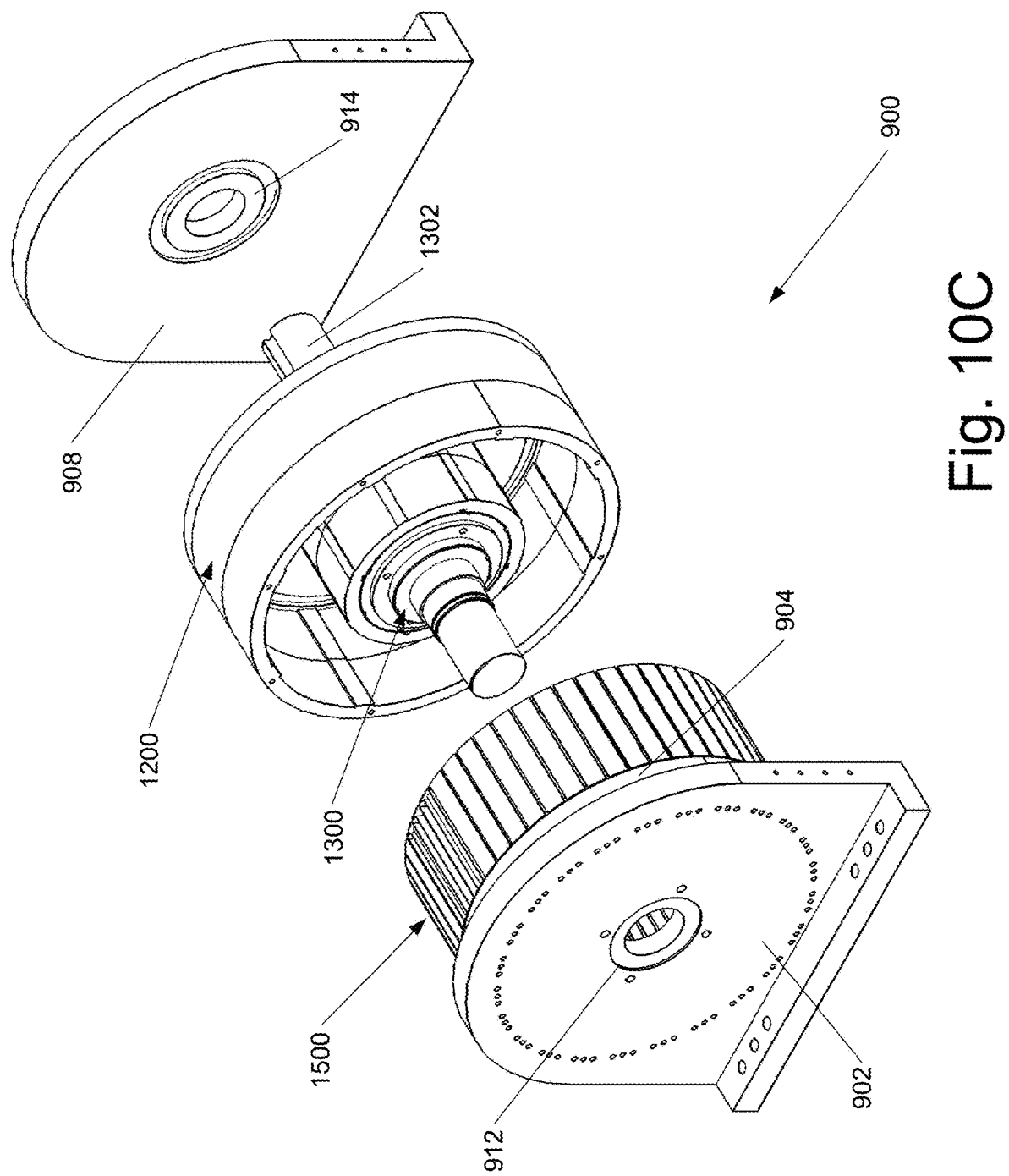
FIG. 10C is an exploded view of a motor/generator incorporating the alternative magnetic cylinder with certain components removed for clarity.

FIG. 10C is another exploded illustration of the system 900 where the stator or coil assembly 1500 is coupled to and supported by the stator end plate 902 via the extension ring 904. Thus, the end plates 902 and 908, the extension ring 904, and the coil assembly 1500 (the stator) are stationary in this configuration. In contrast, the rotor hub 1300 is fixedly coupled to the back iron circuit 1200 which supports and positions the toroidal magnetic cylinder 1430 (not shown in FIG. 10C). The rotor shaft 1302 is structurally supported by the stator end plate 902 and the rotor end plate 904. Bearing units 912 and 914 are positioned between the ends of the rotor shaft 1302 and the end plates to allow the rotor shaft to rotate with respect to the end plates. Thus, as illustrated in FIG. 10C, the coil assembly 1500 (or stator) is fixedly coupled to the end plate 902. In contrast, the toroidal magnetic disc 1430 and the back iron circuit 1200 (or rotor) is rotatably coupled to the end plate 908. The endplates 902 and 908 secure the entire arrangement of the machine and will ensure the integrity of the rotating components.

In certain embodiments, wires and cooling medium may enter the coil assembly 500 from the dedicated end plate 902 via the extension ring 904 via the apertures 903 and 905, respectively. In contrast, the rotating components (the toroidal magnetic disc 1430 and the back iron circuit 1200) may be coupled together and will be coupled in tandem with the rotor hub 1300, which in turn is fixedly coupled to the shaft 1302.

Figure 10D:
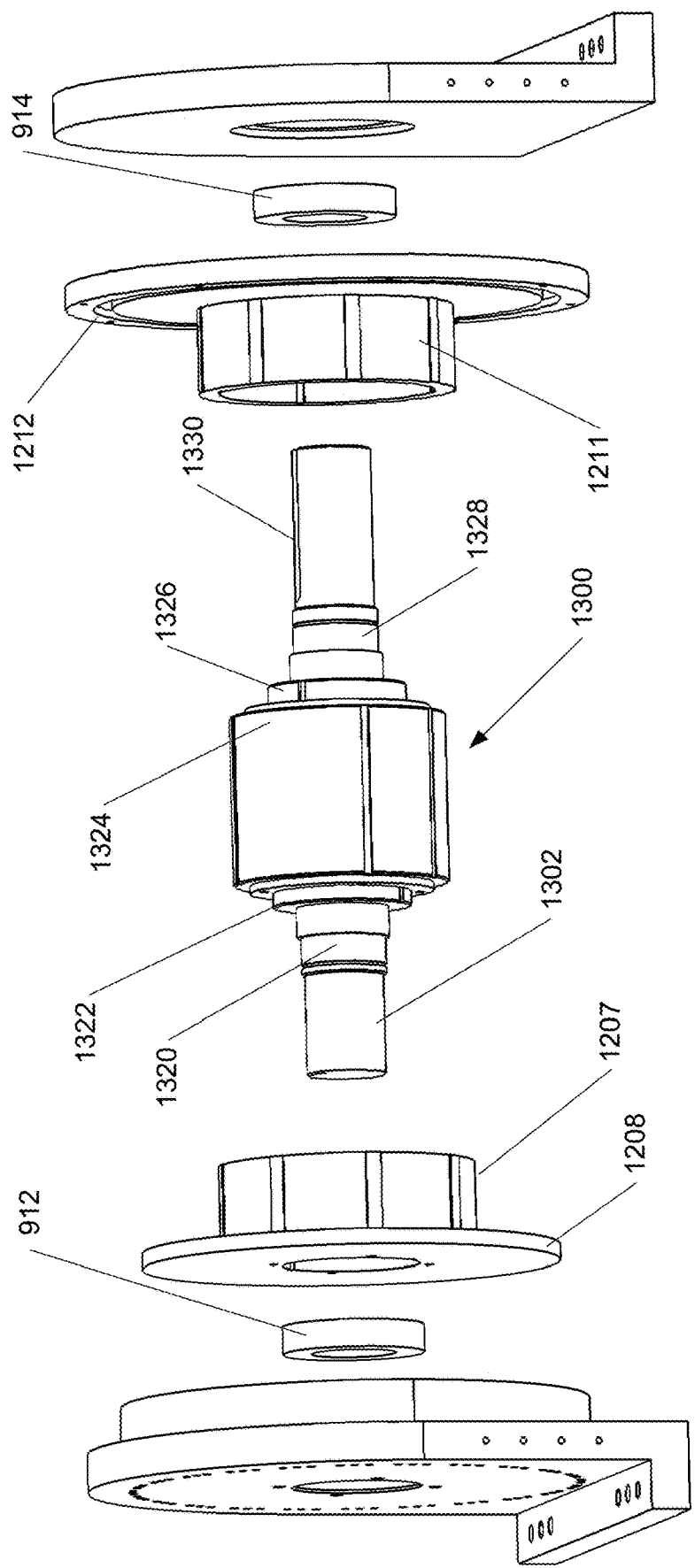
FIG. 10D is an exploded view of a motor/generator incorporating the alternative magnetic cylinder with certain components removed for clarity.

FIG. 10D is a partial exploded view illustrating certain details regarding the rotor hub 1300. The coil assembly 1500 and the outer walls 1206 and 1210 of the back iron circuit have been removed for clarity. The rotor hub 1300 includes a plurality of support shoulders positioned longitudinally along the length of the shaft 1302. A first bearing support shoulder 1320 engages and supports the bearing unit 912. A first centering shoulder 1322 couples to and supports the first side wall 1208 of the back iron circuit 1200. A center shoulder 1324 engages with and supports the inner cylindrical walls 1207 and 1211 of the back iron circuit 1200. A second centering shoulder 1326 supports the second side wall 1212 of the back iron circuit 200. A second bearing support shoulder 1328 is designed to engage with and support the second bearing unit 914. In certain embodiments, a keyway 1330 (see FIG. 10B) may be defined in either end of the rotor shaft 1302.

In the embodiment illustrated in FIGS. 10A through 10D, the coil assembly 1500 is the stator. In other configurations, the coil assembly 1500 may be a rotor. Furthermore, the embodiments as illustrated is only one way of configuring and supporting the coil assembly 1500. In other embodiments the coil assembly 1500 may be supported by support ring extending through a center slot 410 between the outer cylindrical walls 206 and 210 from the coil assembly to an exterior casing or housing (FIGS. 7A and 7B). In yet other embodiments when the coil assembly 500 is functioning as a rotor, the coil assembly may be supported by a support ring extending through a center slot between the inner cylindrical walls 208 and 218 from the coil assembly to the a shaft. The exact configuration depends on design choices as to whether the coil assembly is to be the stator or the rotor.

Advantages of Certain Embodiments

In sum, certain disclosed embodiments have several advantages when compared to traditional motors and generators. Surrounding the coils with magnets as described above creates more flux density and the forces are now all in the direction of motion which may create more torque, minimize vibration, and minimize noise—as compared to conventional motors where forces may try to pull the coil downwards or push it upwards (depending on the polarity), not in the direction of motion. As discussed above, most of the magnetic fields generated are in the direction of motion so there is little, if any, wasted field structure. Continuous torque and continuous power, therefore, are greatly increased. Furthermore, continuous torque density, continuous power density by volume, and continuous power density by weight are also increased when compared to conventional electric motors.

In certain embodiments, the equivalent full torque is available at start with no locked rotor current losses. The permanent magnet configuration has reduced inrush current at start.

In certain embodiments, the coil assembly may be compact and yet the coils are easily cooled because they are surrounded by an effective heat sink. Because there is no reason to overlap the coil windings, there is little, if any unwanted field induction—which also contributes to a more efficient design. One of the advantages of this configuration over conventional motors is that the end turns (in this case the radial section of the coils) are part of the "active section" of the invention. In conventional motors, the axial length of the copper conductor is the section that produces power. The end turns are a penalty, adding weight and losses, but not producing power because the end region fields are not effectively linking the end windings. However, in the above disclosed embodiments, the entire coil winding is effectively used to produce torque due to the side wall or axial magnets which are axially magnetized—efficiently utilizing the copper windings.

As discussed above, surrounding the coils with magnets as described above creates more flux density and the forces are now all in the direction of motion which may create more torque, minimize vibration, and minimize noise—as compared to conventional motors where forces may try to pull the coil downwards or push it upwards (depending on the polarity), not in the direction of motion.

Continuous torque and continuous power, therefore, are greatly increased. Furthermore, continuous torque density, continuous power density by volume, and continuous power density by weight are also increased when compared to conventional electric motors.

In the "DC" configuration, the motor may run independent of power line frequency or manufactured frequencies reducing the need for expensive pulse width modulated drive controllers or similar controllers.

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above described components and features may be individually or sequentially combined with other components or features and still be within the scope of the present invention. Undescribed embodiments which have interchanged components are still within the scope of the present invention. It is intended that the scope of the invention be limited not by this detailed description, but rather by the claims or future claims supported by the disclosure.

The invention claimed is:
1. A rotary electric machine comprising:
   a toroidal magnetic cylinder comprising a first magnetic tunnel segment radially arranged about an axial axis, wherein the first magnetic tunnel segment comprises:
      a first side magnetic wall defining a magnetic pole orientation toward an interior of the first magnetic tunnel segment;
      a first opposing side magnetic wall defining the magnetic pole orientation toward the interior of the first magnetic tunnel segment and positioned along the axial axis opposite the first side magnetic wall;
      a first inner magnetic wall arranged between the first side magnetic wall and the first opposing side magnetic wall and defining the magnetic pole orientation toward the interior of the first magnetic tunnel segment;
      a first outer magnetic wall arranged between the first side magnetic wall and the first opposing side magnetic wall, radially offset from the first inner magnetic wall, and defining the magnetic pole orientation toward the interior of the first magnetic tunnel segment;
      wherein at least one of the magnetic walls comprises a slot; and
   a coil assembly positioned within the circular path and adapted to move relative to the toroidal magnetic cylinder;
   a support structure coupled to the slot at the first magnetic tunnel segment and defining a cavity that contains the coil assembly and the first magnetic tunnel segment; and
   a controller in communication with the coil assembly and configured to control current flow within the coil assembly.
2. The rotary electric machine of claim 1, further comprising a second magnetic tunnel segment:
   radially arranged about the axial axis adjacent the first magnetic tunnel segment to form a circular path; and
   comprising:
      a second side magnetic wall positioned about the axial axis;
      a second opposing side magnetic wall offset from the second side magnetic wall;
      a second inner magnetic wall arranged between the second side magnetic wall and the second opposing side magnetic wall; and
      a second outer magnetic wall:
         radially offset from the second inner magnetic wall; and
         cooperating with the second side magnetic wall, second opposing side magnetic wall, and second inner magnetic wall to define a magnetic pole orientation toward an interior of the second magnetic tunnel segment.
3. The rotary electric machine of claim 2, wherein the second side magnetic wall, second opposing side magnetic wall, and second inner magnetic wall cooperate to define a second set of magnetic poles oriented in an opposite direction from magnetic poles of the first magnetic tunnel segment.
4. The rotary electric machine of claim 1, wherein the support structure comprises:
   a first end plate;
   a second end plate:
      arranged opposite the first end plate;
      comprising a shaft opening; and
      coupling the slot arranged at a first facet at the first magnetic tunnel segment; and
   a set of lateral side plates interposed between the first end plate and the second end plate to define a cavity configured to locate the first magnetic tunnel segment and the coil assembly.
5. The rotary electric machine of claim 1, wherein the first outer magnetic wall comprises:
   a first outer radial magnetic element:
      arranged normal the first side magnetic wall; and
      extending partially across an outer radial facet of the coil assembly; and
   a second outer radial magnetic element:
      arranged normal the first opposing side magnetic wall;
      extending partially across the outer radial facet of the assembly; and
      cooperating with the first outer radial magnetic element to define the slot arranged about the first magnetic tunnel segment.
6. The rotary electric machine of claim 1, wherein the first side magnetic wall extends partially across a first axial facet of the coil assembly to define the slot proximal the first outer magnetic wall in the first magnetic tunnel segment.
7. A system for an electric machine comprising:
   a stator comprising a coil assembly:
      radially arranged about a motor axis; and
      defining an inner radial facet, an outer radial facet, a first axial facet, and a second axial facet opposite the first axial facet;
   a rotor comprising set of magnetic elements:
      encompassing the inner radial facet, the outer radial facet, the first axial facet, and the second axial facet of the coil assembly;
      defining a radial magnetic tunnel about the motor axis;
      configured to generate a flux density distribution focused toward the coil assembly; and
      comprising a slot arranged about the radial magnetic tunnel;

a support structure:
  encompassing the coil assembly and the second of magnetic elements;
  coupled to the slot about the set of magnetic elements; and
  comprising a shaft coaxial with the motor axis and coupled to the rotor; and
a controller configured to generate a magnetic field tunnel that sequentially and magnetically couples the set of magnetic elements contained within the support structure to rotate the rotor.

8. The system of claim 7, wherein the set of magnetic elements comprises:
  a subset of inner radial magnetic elements arranged in a radial pattern about the inner radial facet of the coil assembly;
  a first subset of axial magnetic elements arranged in a radial pattern about the first axial facet of the coil assembly;
  a second subset of axial magnetic elements arranged in a radial pattern about the second axial facet, opposite the first axial facet, of the coil assembly;
  a first subset of outer radial magnetic elements:
    arranged normal the first subset of axial magnetic elements; and
    extending partially across the outer radial facet of the coil assembly; and
  a second subset of outer radial magnetic elements:
    arranged normal the second subset of axial magnetic elements;
    extending partially across the outer radial facet of the coil assembly; and
    cooperating with the first subset of outer radial magnetic elements to define the slot arranged about the outer radial facet.

9. The system of claim 7, wherein the set of magnetic elements comprises:
  a subset of inner radial magnetic elements arranged in a radial pattern about the inner radial facet of the coil assembly;
  a subset of outer radial magnetic elements:
    radially offset from the subset of inner radial magnetic elements; and
    arranged in a radial pattern about the outer radial facet of the coil assembly;
  a first subset of axial magnetic elements:
    arranged normal the subset of inner radial magnetic elements and the subset of outer radial magnetic elements;
    extending partially across the first axial facet of the coil assembly; and
    cooperating with the subset of outer radial magnetic elements to define the slot about the first axial facet; and
  a second subset of axial magnetic elements arranged in a radial pattern about the second axial facet, opposite the first axial facet, of the coil assembly.

10. The system of claim 7, wherein the support structure comprises:
  a first end plate;
  a second end plate:
    arranged opposite the first end plate;
    comprising a shaft opening; and
    coupling the slot arranged at a first facet at the radial magnetic tunnel; and
  a set of lateral side plates interposed between the first end plate and the second end plate to define a cavity configured to locate the radial magnetic tunnel and the coil assembly.

11. The system of claim 10, further comprising a coupling ring:
  interposed between the second end plate of the support structure and a first axial facet of the coil assembly;
  engaging the slot about the first facet of the radial magnetic tunnel; and
  comprising a first set of apertures configured to receive a set of fasteners coupling the support structure to the coil assembly.

12. The system of claim 7, further comprising a center hub:
  arranged within an inner radius of the coil assembly;
  defining a set of inner slots about an outer radial of the center hub; and
  comprising:
    a subset of inner radial magnetic elements, in the set of magnetic elements, arranged at the set of inner slots and facing the inner radial facet of the coil assembly; and
    an inner hub coupling the shaft and locating the shaft in alignments with the motor axis).

13. The system of claim 7:
  further comprising a ring core:
    radially arranged about the motor axis; and
    comprising a set of teeth positioned radially about the ring core and defining a set of interstices about the ring core; and
  wherein the coil assembly comprises a set of windings coiled about the set of interstices about the ring core.

14. The system of claim 13:
  wherein the set of teeth comprises:
    a first tooth:
      coupled to the ring core; and
      comprising first set of fins about the first tooth; and
    a second tooth:
      coupled to the ring core;
      radially offset from the first tooth; and
      defining a second set of fins arranged about the second tooth and cooperating with the first set of fins of the first tooth to define a first radial slot about the ring core; and
  wherein the set of windings comprises a first winding coiled about the first radial slot interposed between the first tooth and the second tooth.

15. The system of claim 7, wherein the set of magnetic elements defines a first tunnel segment comprising:
  a first magnetic element extending across the first axial facet of the coil assembly;
  a first opposing magnetic element extending across the second axial facet, opposite the first axial facet, of the coil assembly;
  a first inner radial magnetic element extending across the inner radial facet of the coil assembly; and
  a first outer radial magnetic element:
    radially offset from the first inner radial magnetic element;
    extending across the outer radial facet of the coil assembly; and
    cooperating with the first magnetic element, the first opposing magnetic element, and the first inner radial magnetic element to define a first magnetic pole orientation towards an interior of the first tunnel segment.

16. The system of claim 15, wherein the set of magnetic elements defines a second tunnel segment:
comprising a second magnetic element:
adjacent the first magnetic element; and
extending across the first axial facet of the coil assembly;
a second opposing magnetic element:
adjacent the first opposing magnetic element; and
extending across the second axial facet, opposite the first axial facet, of the coil assembly;
a second inner radial magnetic element:
adjacent the first inner radial magnetic element; and
extending across the inner radial facet of the coil assembly; and
a second outer radial magnetic element:
adjacent the first outer radial magnetic element;
radially offset from the second inner radial magnetic element;
extending across the outer radial facet of the coil assembly; and
cooperating with the second side magnetic wall, second opposing side magnetic wall, and second inner magnetic wall to define a second magnetic pole orientation, different from the first magnetic pole orientation, towards an interior of the second magnetic tunnel segment.

17. The system of claim 7, further comprising a back iron circuit comprising:
a first outer plate:
defining a first set of outer slots; and
comprising a first subset of axial magnetic elements, in the set of magnetic elements, arranged at the first set of outer slots and facing the first axial facet of the set of coil assemblies;
a second outer plate:
arranged opposite the first outer plate;
defining a second set of outer slots; and
comprising a second subset of axial magnetic elements, in the set of magnetic elements, arranged at the second set of outer slots and facing the second axial facet of the set of coil assemblies; and
an outer radial wall:
interposed between the first outer plate and the second outer plate;
defining a set of outer slots arranged about the outer radial wall; and
comprising a subset of outer radial magnetic elements, in the set of magnetic elements, arranged at the set of outer slots and facing the outer radial facet of the set of coil assemblies.

18. A system for an electric machine comprising:
a stator comprising a coil assembly:
radially arranged about a motor axis; and
defining an inner radial facet, an outer radial facet, a first axial facet, and a second axial facet opposite the first axial facet;
a rotor comprising set of magnetic elements:
encompassing the inner radial facet, the outer radial facet, the first axial facet, and the second axial facet of the coil assembly;
defining a radial magnetic tunnel about the motor axis;
configured to generate a flux density distribution focused toward the coil assembly; and
comprising a slot arranged at the outer radial facet of the radial magnetic tunnel; and
a support structure:
encompassing the coil assembly and the second of magnetic elements;
coupled to the slot about the set of magnetic elements; and
comprising a shaft coaxial with the motor axis and coupled to the rotor.

19. The system of claim 18, wherein the set of magnetic elements comprises:
a subset of inner radial magnetic elements arranged in a radial pattern about the inner radial facet of the coil assembly;
a first subset of axial magnetic elements arranged in a radial pattern about the first axial facet of the coil assembly;
a second subset of axial magnetic elements arranged in a radial pattern about the second axial facet, opposite the first axial facet, of the coil assembly;
a first subset of outer radial magnetic elements:
arranged normal the first subset of axial magnetic elements; and
extending partially across the outer radial facet of the coil assembly; and
a second subset of outer radial magnetic elements:
arranged normal the second subset of axial magnetic elements;
extending partially across the outer radial facet of the coil assembly; and
cooperating with the first subset of outer radial magnetic elements to define the slot arranged about the outer radial facet.

20. The system of claim 18, wherein the support structure comprises:
a first end plate;
a second end plate:
arranged opposite the first end plate;
comprising a shaft opening; and
coupling the slot arranged at a first facet at the first magnetic tunnel segment;
a set of lateral side plates interposed between the first end plate and the second end plate to define a cavity configured to locate the first magnetic tunnel segment and the coil assembly; and
a support ring:
interposed between the second end plate of the support structure and a first axial facet of the coil assembly;
engaging the slot about the outer facet of the radial magnetic tunnel; and
comprising a first set of apertures configured to receive a set of fasteners coupling the support structure to the coil assembly.

* * * * *